United States Patent
Dhakshinamoorthy et al.

(10) Patent No.: US 10,764,319 B2
(45) Date of Patent: Sep. 1, 2020

(54) INTELLIGENT AUTOMATED SECURITY VULNERABILITY DETECTION AND ANALYSIS FOR INDUSTRIAL INTERNET OF THINGS (IIOT) DEVICES

(71) Applicant: Honeywell International Inc., Morris Plains, NJ (US)

(72) Inventors: Chandirasekaran Dhakshinamoorthy, Govindasalai (IN); Rodney Stein, Edmonton (CA); Ashoka Settihalli, Bangalore (IN)

(73) Assignee: Honeywell International Inc., Morris Plains, NJ (US)

( * ) Notice: Subject to any disclaimer, the term of this patent is extended or adjusted under 35 U.S.C. 154(b) by 231 days.

(21) Appl. No.: 16/051,069

(22) Filed: Jul. 31, 2018

(65) Prior Publication Data

US 2019/0109872 A1   Apr. 11, 2019

Related U.S. Application Data

(60) Provisional application No. 62/568,594, filed on Oct. 5, 2017.

(51) Int. Cl.
| | |
|---|---|
| H04L 29/06 | (2006.01) |
| H04L 12/26 | (2006.01) |
| G06N 7/02 | (2006.01) |
| G06F 21/56 | (2013.01) |
| G06F 21/57 | (2013.01) |
| H04L 29/08 | (2006.01) |
| H04W 4/70 | (2018.01) |

(52) U.S. Cl.
CPC .......... H04L 63/1433 (2013.01); G06F 21/56 (2013.01); G06F 21/577 (2013.01); G06N 7/02 (2013.01); H04L 43/06 (2013.01); H04L 63/1466 (2013.01); H04L 67/12 (2013.01); H04W 4/70 (2018.02)

(58) Field of Classification Search
CPC .................................................. H04L 63/1433
See application file for complete search history.

(56) References Cited

U.S. PATENT DOCUMENTS

| 7,761,923 B2* | 7/2010 | Khuti | H04L 63/02 726/11 |
|---|---|---|---|
| 2006/0064503 A1* | 3/2006 | Brown | H04L 67/12 709/238 |
| 2007/0088534 A1* | 4/2007 | MacArthur | G05B 17/02 703/17 |

OTHER PUBLICATIONS

Postol, "Address Space Interchange XML", Manual, CAS, May 2015, 36 pages.
Postol, "OPC UA Information Model Deployment", Whitepaper, CAS, Aug. 2015, 41 pages.

* cited by examiner

*Primary Examiner* — Simon P Kanaan

(57) ABSTRACT

A method, an electronic device, and a computer readable medium for vulnerability detection are disclosed. The method includes generating a mapped dataset of a portion of an OPC UA server by mapping the portion of the server, wherein the server is compatible with OPC UA machine to machine (M2M) protocol communication including transport encodings and services. The method also includes identifying input test data to test the portion of the server based in part on the mapped dataset set in order to detect errors. The method further includes performing a plurality of targeted attacks by loading the input test data onto the portion of the server. In response to loading the input test data into the server, the method includes monitoring responses of the server to detect an error. Further, in response to detecting the error the method includes generating a report that indicates the detect error.

18 Claims, 6 Drawing Sheets

INTELLIGENT AUTOMATED SECURITY VULNERABILITY DETECTION AND ANALYSIS FOR INDUSTRIAL INTERNET OF THINGS (IIOT) DEVICES

CROSS-REFERENCE TO RELATED APPLICATION AND CLAIM OF PRIORITY

This application claims priority under 35 U.S.C. § 119(e) to U.S. Provisional Patent Application No. 62/568,594 filed on Oct. 5, 2017. The above-identified provisional patent application is hereby incorporated by reference in its entirety.

TECHNICAL FIELD

This disclosure relates generally to industrial process control and automation systems. More specifically, this disclosure relates to an apparatus and method for intelligent security vulnerability analysis for industrial internet of things devices.

BACKGROUND

Industrial process control and automation systems are often used to automate large and complex industrial processes. These types of control and automation systems routinely include process controllers and field devices like sensors and actuators. Some of the process controllers typically receive measurements from the sensors and generate control signals for the actuators.

Process controllers and field devices are routinely connected with each other and with human operators via one or more communication networks. Operators in these types of control and automation systems may request data related to the various process controllers and field devices using the communication networks. Operators may use this information to perform various tasks, such as to track the status of the controllers and field devices and to decide whether changes to the control and automation systems or the underlying industrial processes should be made. To prevent malicious actors from hijacking these types of systems, security testing may be performed to search for vulnerabilities in both the communication networks and the process controllers and field devices themselves.

Cyber-security is of increasing concern, and unaddressed security vulnerabilities in any component of a connected industrial process control and automation system could be exploited by malicious actors to disrupt operations or cause unsafe conditions in the industrial facility. Malicious actors continue to leverage new technologies to exploit weaknesses, while cyber-security solutions (such as antivirus solutions and firewall solutions) often cannot keep pace with new threats. For example, antivirus solutions can often only protect against threats already known and catalogued in their signature databases. As another example, firewalls are often only as effective as their configurations and technology stacks enable them to be. Firewalls, virus protectors, and user authentication attempt to prevent such attacks, however connected systems are still susceptible to attacks, denial of server, and data theft. As a result, it is becoming increasingly difficult for organizations to rely on cyber-security solutions to protect their networks and systems from intrusions or other exploits.

SUMMARY

This disclosure provides an apparatus and method for intelligent automated security vulnerability detection and analysis for industrial internet of things devices.

In a first embodiment, a method is provided. The method includes generating a mapped dataset of a portion of a server by mapping the portion of the server, wherein the server is compatible with machine to machine protocol communication including transport encodings and services. The method also includes identifying input data to test the portion of the server based in part on the mapped dataset set in order to detect errors. The method further includes performing a plurality of targeted attacks by loading the identified input data onto the portion of the server. In response to loading the identified input data into the server, the method includes monitoring responses of the server to detect an error. Further, in response to detecting the error, the method includes generating a report that indicates the detect error.

In a second embodiment, an electronic device is provided. The electronic device includes a communication unit, an interface; and a processor. The communication unit is configured to communicate with a server. The processor is operably connected to the communication unit and the interface. The processor is configured to generate a mapped dataset of a portion of the server by mapping the portion of the server, wherein the server is compatible with machine to machine protocol communication including transport encodings and services. The processor is also configured identify input data to test the portion of the server based in part on the mapped dataset set in order to detect errors. The processor is further configured to perform a plurality of targeted attacks by loading the identified input data onto the portion of the server. In response to loading the identified input data into the server, the processor is configured to monitor responses of the server to detect an error. In response to detecting the error, the processor is configured to generate a report that indicates the detect error.

In a third embodiment, a non-transitory computer readable medium is provided. The non-transitory computer readable medium embodies a computer program, the computer program comprising computer readable program code that when executed by a processor of an electronic device causes processor to: generate a mapped dataset of a portion of a server by mapping the portion of the server, wherein the server is compatible with machine to machine protocol communication including transport encodings and services; identify input data to test the portion of the server based in part on the mapped dataset set in order to detect errors; perform a plurality of targeted attacks by loading the identified input data onto the portion of the server; in response to loading the identified input data into the server, monitor responses of the server to detect an error; and in response to detecting the error generate a report that indicates the detect error.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
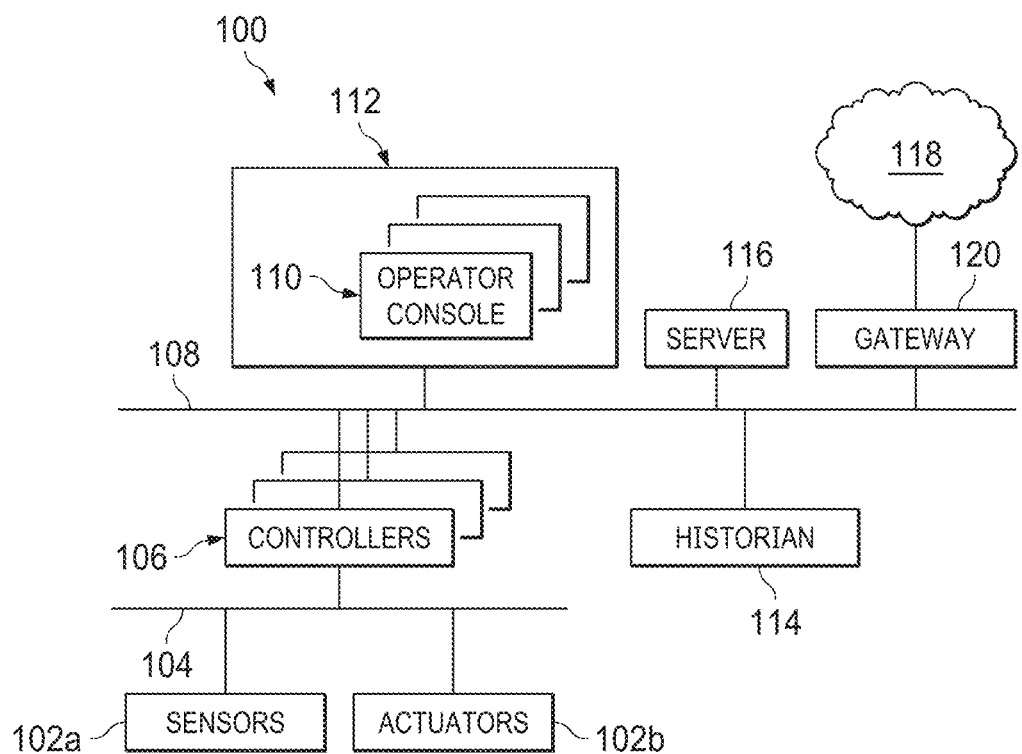
FIG. 1 illustrates an example industrial process control and automation system in accordance with embodiments of the present disclosure.

FIGS. 1 through 9, discussed below, and the various embodiments used to describe the principles of the present invention in this patent document are by way of illustration only and should not be construed in any way to limit the scope of the disclosure. Those skilled in the art will understand that the principles of the invention may be implemented in any type of suitably arranged device or system.

Internet of Things (IoT) is a network of physical devices that are connected that are capable of exchanging data or performing various tasks or a combination thereof. IoT includes various devices and entities 'things' that can exchange and process information with and without human intervention. IoT devices are applicable to a variety of fields including smart home, smart building, smart city, smart car or connected cars, smart grid, health care, smart appliances and advanced medical services through convergence and combination between existing Information Technology (IT) and various industrial applications. For example, principles associated with IoT are encroaching into the industrial process control and automation systems, referred to as the industrial internet of things (IIoT).

IIoT is commonly referred to as the fourth industrial revolution. For example, the first revolution was mechanical based with the advent of steam power. The second revolution was the beginning of mass production. The third revolution originated with communication systems, such as the creation of Programmable Logic Controller (PLC). A PLC allows devices in an industrial setting to communicate and allows a level of control of the various devices. The onset of IIoT that includes smart sensors, and machine to machine communication networks is now the fourth industrial revolution.

IIoT is changing the manufacturing and processing industries, as devices, equipment, components, sensors, and the like are becoming smarter. Such elements are becoming smarter due to the ability to generate larger amounts of data at greater speeds, as well as an ability of the elements to communicate between themselves with and without human interaction. Operators, engineers, and personnel of an industrial plant are struggling to keep up with the drastic increase of data while continually striving to improve the efficiency of the plant. Further, operators, engineers, and personnel of an industrial plant are struggling to secure the vast amounts of data generated by the IIoT devices. For example, IIoT devices such as sensing technology, wired/wireless communication and network infrastructure, interface technology, security technology, and Machine-to-Machine (M2M) communication, to name a few, are improving the efficiency of an automation system yet can also provide new access points for an actor to perform malicious acts to the automation system.

OPC Unified Architecture (UA) provides a platform for manufacturer-independent communication between devices of industrial automation systems or plants. For example, OPC UA includes a M2M communication protocol for interoperability and includes a cross-platform service-oriented architecture. OPC UA is a communication mechanism for industrial process control systems to communicate by allowing intelligent machines, including IIoT devices, to communicate with each other. For example, OPC UA provides an ability to transfer data between enterprise-type systems, control systems, monitoring devices, industrial equipment, sensors, and the like. OPC UA allows for various electronic devices to exchange information even when the devices utilize different protocols, platforms, architecture, and the like. For example, OPC UA incorporates a large network of devices that can communicate with each other and generate vast amounts of data. Those skilled in the art can appreciate that other systems and protocols in addition to or alternatively of OPC UA can be used interchangeably.

As noted above, industrial automation systems include capabilities that enable the control and monitoring of the system or process. For example, industrial automation systems often include controllers, field devices, sensors, actuators, computing devices, and the like. Such elements allow for gathering, storing, and monitoring data for subsequent analysis. Such industrial automation systems may include one or more devices that may be coupled to the controller and may communicate with other systems. In certain embodiments, the one or more devices of an industrial automation system can be coupled to the controller and may communicate according to the OPC UA protocol. Included in the various devices and elements are IIoT devices that incorporate OPC UA M2M communication, as well as machine learning. IIoT provides improved quality control and oversight and can improve the efficiency of the overall industrial plant.

In certain embodiments, OPC UA allows IIoT devices such as embedded computers associated with sensors or devices to communicate with one or more computing devices, such as a server, that can store data and values regarding the operational parameters of an industrial automation system. In certain embodiments, OPC UA can connect databases, analytic tools with data generated from sensors, actuators, and other monitoring type devices that evaluate the various parameters of the industrial plant. An unintended result of the open communication and data exchange is the ability for a malicious actor to access the system and steal data or cause a denial of service (DOS) or even cause the ecosystem of the IIoT devices at the industrial plant to fail. Embodiments of the present disclosure include system and methods to detect security vulnerability of the industrial IIoT.

It is important that applications or solutions that are designed for IIoT and connected devices are secure. The availability of mission-critical devices is a top priority for creating confidence in the reliability of a system using IIoT devices. OPC UA includes OPC UA M2M protocols designed for communications within an industrial setting for IIoT devices. IIoT applications built using OPC UA infrastructure can be tested for different attack vectors or injection attacks that could compromise Confidentially, Integrity, and Availability (CIA) of IIoT devices and bring down the IIoT ecosystem. Manually testing for different attack vectors or injection attacks is complex and time consuming. Intelligent automated injection and security fuzzer test tools for OPC UA would therefore be useful for IIoT vendors to improve the reliability and resilience of their IIoT products.

Embodiments of the present disclosure include system and methods for testing for various attack vectors and injection attacks as well as detecting vulnerabilities within the OPC UA M2M communication environment. A security fuzzer, simply known as a fuzzer, is a software tool that randomly tests interfaces on a network for vulnerabilities. A fuzzer performs fuzz testing that is a type of quality assurance that is used to discover coding errors and security loopholes in software.

Fuzzing refers to a process of altering the data of valid test cases and program input (collectively, "fuzzed test data"), so as to generate new test cases. Fuzzed test data may be fuzzed to test a variety of different types of software or components. The fuzzing process is automated, guided by alterations programmed by a human tester. The fuzzing process may include running a series of simulated attacks against a component under test, with a view toward discovering flaws or bugs in the component under test. A fuzzer inputs data into the software that is undergoing a test in order to attempt to find bugs as well as vulnerabilities in the software. For example, a fuzzer can input random data into a program and then monitor the program to identify if or when the program crashes or undergoes a memory leak. For instance, the fuzzer can randomly alter or generate values that are used as inputs to test the responses of the various components that are being evaluated. The values that are randomly altered or generated by a fuzzer can be inputted into the system being tested without the fuzzer inspecting any feature of the testing product to identify valid and invalid inputs.

A fuzzer provides random inputs into software in order to test the software or program. The input generated by a fuzzer can take on a variety of forms, such as a network protocol, a file of a certain format, a direct user input, a value, and the like. "Dumb" fuzzing techniques do not inspect the data that is being fuzzed, and randomly alter or generate values to be fed to the components under test. For example, the input is completely random with no knowledge of what the input should look like. In order to test the OPC UA system, a "dumb fuzzer" would therefore be manually configured, and a plant security technician would need to set attack vectors that are tailored to each UA interface being tested. Similarly, a "dumb fuzzer" can be manually configured by a software tester during a software development phase of the lifecycle of the software. This could also be used in a lab environment by a UA server developer for testing.

Generative fuzzing is a process in which data is created without any valid data as a baseline for fuzzing, although a schema may represent any format to which the fuzzed data is to conform. Mutilation fuzzing involves modifying and mutilating already valid data, in an effort to create additional test cases.

Embodiments of the present disclosure take into consideration and recognize that fuzzers that generate completely random values with no knowledge of what the input should look like provide a limited benefit for software and systems that are complex and specialized, such as OPC UA. Embodiments of the present disclosure describe "smart" fuzzing techniques that inspect the layout of the data that is being fuzzed, so that the fuzzed data may look correct, or optimal, or both. In this manner, the fuzzed data may pass restrictive parsing or filtering before reaching the components under test.

For example, simple program includes a "name field" with a specified "name length" as an input. If the fuzzer testing the program is a dumb fuzzer, the dumb fuzzer may not input data into these fields in a form that the program can identify. In this case, the program may never read the name. If the fuzzer testing the program is a smart fuzzer, the smart fuzzer inputs data in the field in a valid form, but if the length value is an incorrect value, the program can read beyond the buffer containing the name and trigger a crash. In this example, the fuzzer has a small knowledge of the type of input required to enter a value that is partially valid.

Fuzzing architectures may include different components that perform various functions related to the overall fuzzing operation. These architectures may not enable these different components to communicate with one another. Because of this shortcoming, it may be difficult for testers to determine when a bug has been located, or to isolate which fuzzed traffic caused a particular problem.

Additionally, fuzzing techniques may not collect all of the data that results from the fuzzing operations into one location. As a result, it may be difficult to correlate results from a variety of different test runs, and determine which set of test conditions caused a particular error or failure to occur. For example, in the context of testing an application in a client-server environment, a server application may be tested by submitting a large number of test requests to it. If one of these numerous requests crashes the server or causes the server to fail, it may be difficult to isolate which particular request, sequence of requests, or other circumstances led to the failure.

Embodiments of the present disclosure recognize that OPC UA programming and communication protocols include a variety of layers with each layer dependent on the previous layer. A fuzzer that has no knowledge of the OPC UA environment such as predefined OPC UA Information models and Service sets is unable to fully test the system, as specific inputs are necessary to access higher levels. Additionally, a previous input can affect a future input. Therefore embodiments of the present disclosure illustrate an intelligent feedback based fuzzer with knowledge and an understanding of the OPC UA environment allowing the fuzzer to automatically test the OPC UA environment Embodiments of the present disclosure describe an intelligent automatic brute-force vulnerability detector and analyzer for IIoT. The analyzer provides an intelligent variant of fuzzing using built-in knowledge of the OPC UA data model elements and transport encodings which may include United Architecture Transmission Control Protocol (UATCP) and United Architecture Datagram Packet (UADP). The fuzzer is therefore effective and intelligent enough to be aware of the OPC UA protocol elements. The fuzzer can also include is a machine learning techniques for an optimal fuzzing methodology. Machine learning techniques enables automated exploratory testing of the OPC UA products. This also provides the ability to perform a highly-automated fuzz test on different transport encodings, such as United Architecture Transmission Control Protocol (UATCP) and United Architecture Datagram Packet (UADP).

For example, embodiments of the present disclosure provide an automatic, intelligent variant of fuzzing by using a built-in OPC UA model mapping. The OPC UA model mapping makes the fuzzer tool aware of which elements of the protocol it is fuzzing. The intelligent OPC UA fuzzer could be an OPC UA client application that acts as a security watchdog, and could run in any IIoT node.

FIG. 1 illustrates an example industrial process control and automation system 100 according to embodiments of the present disclosure. As shown in FIG. 1, the system 100 includes various components that facilitate production or processing of at least one product or other material. For instance, the system 100 can be used to facilitate control over components in one or multiple industrial plants. Each plant represents one or more processing facilities (or one or more portions thereof), such as one or more manufacturing facilities for producing at least one product or other material. In general, each plant may implement one or more industrial processes and can individually or collectively be referred to as a process system. A process system generally represents any system or portion thereof configured to process one or more products or other materials in some manner.

In FIG. 1, the system 100 includes one or more sensors 102a and one or more actuators 102b. The sensors 102a and actuators 102b represent components in a process system that may perform any of a wide variety of functions. For example, the sensors 102a could measure a wide variety of characteristics in the process system, such as flow, pressure, or temperature. Also, the actuators 102b could have a wide variety of characteristics in the process system, such as valve openings. Each of the sensors 102a includes any suitable structure for measuring one or more characteristics in a process system. Each of the actuators 102b includes any suitable structure for operating on or affecting one or more conditions in a process system. In some embodiments, functions of the controllers 106, described further below, may be integrated into sensors 102a and actuators 102b and contain OPC UA servers. The sensors 102a with the integrated functions of the controllers 106 may connect to controllers 106 or directly to the network 108. In certain embodiments, the one or more sensors 102a and the one or more actuators 102b are IIoT devices.

In certain embodiments, the sensors 102a and the actuators 102b are connected to at least one network 104. The network 104 generally represents any suitable communication network(s). The network 104 could represent any suitable network or combination of networks. In certain embodiments, the network 104 is an internal network that provides feedback from the sensor 102a and the actuator 102b to owners/operators of the system 100. In certain embodiments, the network 104 is an external network, outside the control of owners/operators of the system 100, but provides feedback from the sensor 102a and the actuator 102b to a third party network.

The network 104 facilitates interaction with the sensors 102a and the actuators 102b. For example, the network 104 could transport measurement data from the sensors 102a and provide control signals to the actuators 102b. As particular examples, the network 104 could represent at least one Ethernet network (such as one supporting a FOUNDATION FIELDBUS protocol), electrical signal network (such as a HART network), pneumatic control signal network, or any other or additional type(s) of network(s).

The system 100 also includes various controllers 106. The controllers 106 can be used in the system 100 to perform various functions in order to control one or more industrial processes. For example, a first set of controllers 106 may use measurements from the one or more sensors 102a to control the operation of the one or more actuators 102b. For example, a controller 106 could receive measurement data from the one or more sensors 102a and use the measurement data to generate control signals for the one or more actuators 102b. A second set of controllers 106 could be used to optimize the control logic or other operations performed by the first set of controllers. A third set of controllers 106 could be used to perform additional functions. The controllers 106 could therefore support a combination of approaches, such as regulatory control, advanced regulatory control, supervisory control, and advanced process control.

Each controller 106 includes any suitable structure for controlling one or more aspects of an industrial process. At least some of the controllers 106 could, for example, represent proportional-integral-derivative (PID) controllers or multivariable controllers, such as controllers implementing model predictive control (MPC) or other advanced predictive control (APC). As a particular example, each controller 106 could represent a computing device running a real-time operating system, a WINDOWS operating system, or other operating system.

At least one network 108 couples the controllers 106 and other devices in the system 100. The network 108 facilitates the transport of information between components. The network 108 could represent any suitable network or combination of networks. As particular examples, the network 108 could represent at least one Ethernet network or an RS485/RS422 communication network. In certain embodiments, the network 108 is similar to or the same network as the network 104.

Operator access to and interaction with the controllers 106 and other components of the system 100 can occur via various operator consoles 110. Each operator console 110 could be used to provide information to an operator and receive information from an operator. For example, each operator console 110 could provide information identifying a current state of an industrial process to the operator, such as values of various process variables and warnings, alarms, or other states associated with the industrial process. Each operator console 110 could request information affecting how the industrial process is controlled, such as by requesting set points or control modes for process variables controlled by the controllers 106 or other information that alters or affects how the controllers 106 control the industrial process. This could include requesting this information from the controllers 106 or from other devices such as the historian 114 or the servers 116, described further below. In response to such requests, each operator console 110 could receive the requested information. Each operator console 110 includes any suitable structure for displaying information to and interacting with an operator. For example, each operator console 110 could represent a computing device running a WINDOWS operating system or other operating system. In some embodiments, the operator console 110 could represent an embedded OPC UA client device that accesses one or more OPC UA servers.

Multiple operator consoles 110 can be grouped together and used in one or more control rooms 112. Each control room 112 could include any number of operator consoles 110 in any suitable arrangement. In some embodiments, multiple control rooms 112 can be used to control an industrial plant, such as when each control room 112 contains operator consoles 110 used to manage a discrete part of the industrial plant.

The control and automation system 100 also includes at least one historian 114 and one or more servers 116. The historian 114 represents a component that stores various information about the system 100. The historian 114 could, for instance, store information that is generated by the various controllers 106 during the control of one or more industrial processes. The historian 114 includes any suitable structure for storing and facilitating retrieval of information. Although shown as a single component here, the historian 114 could be located elsewhere in the system 100, or multiple historians could be distributed in different locations in the system 100.

Each server 116 denotes a computing device that executes applications for users of the operator consoles 110 or other applications. The applications could be used to support various functions for the operator consoles 110, the controllers 106, or other components of the system 100. Each server 116 could represent a computing device running a WINDOWS operating system or other operating system, such as a UA server in an embedded device. Note that while shown as being local within the control and automation system 100, the functionality of the server 116 could be remote from the control and automation system 100. For instance, the functionality of the server 116 could be implemented in a computing cloud 118 or a remote server communicatively coupled to the control and automation system 100 via a gateway 120.

At least one component of the system 100 could support a mechanism for intelligently analyzing security vulnerabilities of devices within the system 100. For example, this functionality could be implemented in an operator console 110, a server 116, or a computing cloud 118 or remote server.

In certain embodiments, OPC UA supports multiple servers. Each server can be associated with one or more sensors such as one or more of the sensor 102a, one or more pieces of equipment, or a combination thereof. In some embodiments, OPC UA is an independent platform that can be attached to a wide variety of devices and enables the devices to communicate with each other. In certain embodiments, each OPC UA server includes a description of itself to allow the fuzzer tool to read the description and tailor the fuzzing to the server's structure and the data within the server.

Although FIG. 1 illustrates one example of an industrial process control and automation system 100, various changes may be made to FIG. 1. For example, the system 100 could include any number of sensors, actuators, controllers, networks, operator consoles, control rooms, historians, servers, and other components. Also, the makeup and arrangement of the system 100 in FIG. 1 is for illustration only. Components could be added, omitted, combined, further subdivided, or placed in any other suitable configuration according to particular needs. Further, particular functions have been described as being performed by particular components of the system 100. This is for illustration only. In general, control and automation systems are highly configurable and can be configured in any suitable manner according to particular needs. In addition, FIG. 1 illustrates one example operational environment where intelligent analysis of security vulnerabilities of devices is possible. This functionality can be used in any other suitable system.

Figure 2:
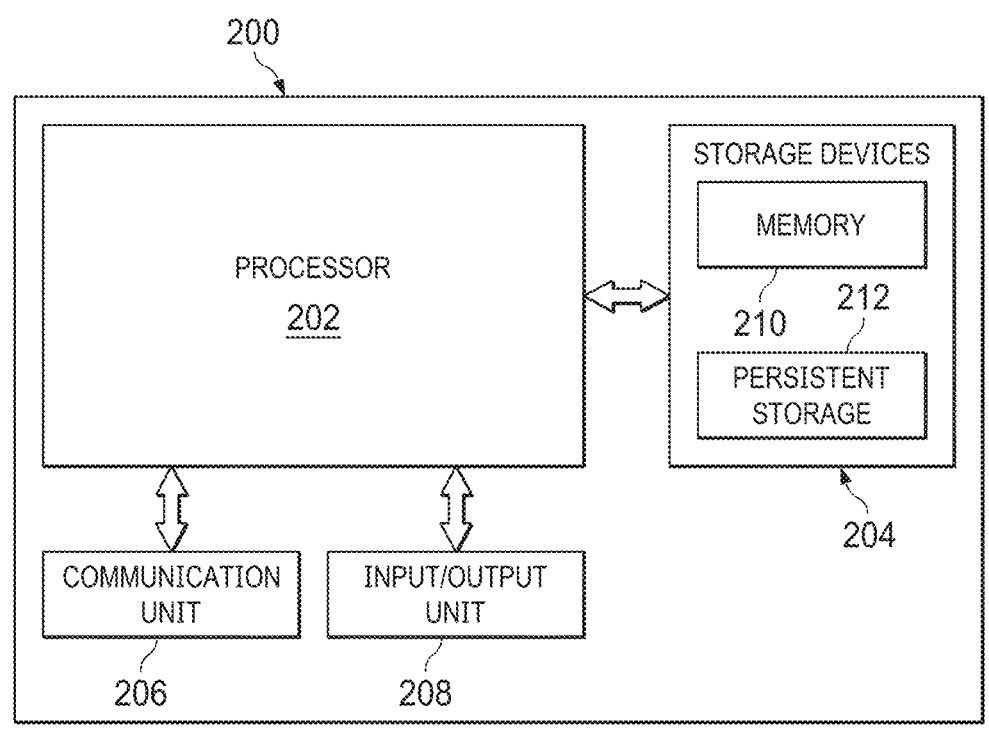
FIG. 2 illustrates an example computing device in accordance with embodiments of the present disclosure.

FIG. 2 illustrates an example device 200 for intelligent security vulnerability analysis for industrial internet of things (IIOT) devices according to this disclosure. In some embodiments, the device 200 could denote an operator console 110, server 116, or device used in the computing cloud 118 described above with respect to FIG. 1. However, the device 200 could be used in any other suitable system.

In some embodiments, the device 200 is an IIoT device. The device 200 could be used to run applications. The device 200 could be used to perform one or more functions, such as receiving an input for information about the industrial plant or deriving a result for the received input and providing the result, or a combination thereof. For ease of explanation, the device 200 is described as being used in the system 100 of FIG. 1, although the device could be used in any other suitable system (whether or not related to industrial process control and automation).

As shown in FIG. 2, the device 200 includes at least one processor 202, at least one storage device (such as storage devices 204, at least one communication unit 206, and at least one input/output (I/O) unit 208. Each processor 202 can execute instructions, such as those that may be loaded into a memory 210. Each processor 202 denotes any suitable processing device, such as one or more microprocessors, microcontrollers, digital signal processors, application specific integrated circuits (ASICs), field programmable gate arrays (FPGAs), or discrete circuitry.

The memory 210 and a persistent storage 212 are examples of storage devices 204, which represent any structure(s) capable of storing and facilitating retrieval of information (such as data, program code, and/or other suitable information on a temporary or permanent basis). The memory 210 may represent a random access memory or any other suitable volatile or non-volatile storage device(s). The persistent storage 212 may contain one or more components or devices supporting longer-term storage of data, such as a read only memory, hard drive, Flash memory, or optical disc.

The communication unit 206 supports communications with other systems or devices. For example, the communication unit 206 could include a network interface card or a wireless transceiver facilitating communications over a wired or wireless network. The communication unit 206 may support communications through any suitable physical or wireless communication link(s).

The I/O unit 208 allows for input and output of data. For example, the I/O unit 208 may provide a connection for user input through a keyboard, mouse, keypad, touchscreen, or other suitable input device. The I/O unit 208 may also send output to a display, printer, or other suitable output device.

Although FIG. 2 illustrates one example of a device 200 for intelligently analyzing security vulnerabilities of IIOT devices, various changes may be made to FIG. 2. Additionally, components could be added, omitted, combined, further subdivided, or placed in any other suitable configuration according to particular needs. Also, computing devices can come in a wide variety of configurations, and FIG. 2 does not limit this disclosure to any particular configuration of computing device.

In certain embodiments, the device 200 includes a lab architecture for running and testing new protocols for an OPC UA system. For example, the lab architecture can include a process control network that allows particular servers and particular devices to be tested in isolation. The lab architecture can include a simulated network. In certain embodiments, the device 200 is an automated build system. For example, every time source code is changed, the device 200 builds the program for the user. In certain embodiments, the device 200 includes a bench test that allows individual products to be tested during development stages.

Figure 3A:
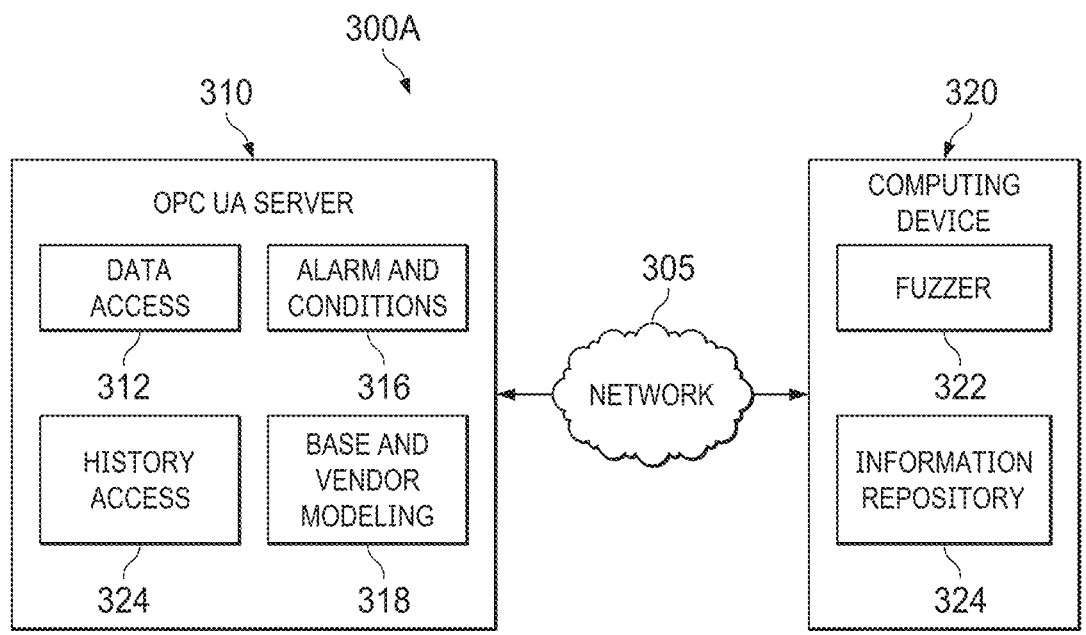
FIG. 3A illustrates an example block diagram of a communication system in accordance with embodiments of the present disclosure.

FIG. 3A illustrates an example block diagram 300A of a communication system in accordance with embodiments of the present disclosure. FIG. 3A illustrates a high-level architecture, in accordance with an embodiment of this disclosure. The embodiment of the block diagram 300A shown in FIG. 3A is for illustration only. Other embodiments can be used without departing from the scope of the present disclosure. FIG. 3A provides additional details of how security analysis may be tailored to intelligently analyze IIoT devices of an industrial process control and automation system. For instance, a security analysis to intelligently analyze IIOT devices of an industrial process control and automation system can be tailored to the OPC UA infrastructure and protocols. Block diagram 300A includes a computing device 320 and an OPC UA server 310 communicating via a network 305.

In certain embodiments, the network 305 includes a larger networking environment. For example, the network 305 can be used for communication between the computing device 320 and the OPC UA server 310. The network 305 can also be used for communication between the operator console 110 (of FIG. 1), the server 116 (of FIG. 1), the gateway 120 (of FIG. 1), the computing device 320, and the OPC UA server 310, or any combination thereof. The network 305 is also able to provide a communication medium between the industrial components such as equipment, sensors (such as the sensor 102a of FIG. 1) and actuators (such as the actuators 102b of FIG. 1) as well as additional servers and equipment (not shown). For example, the network 305 can be connected to an information repository (i.e., a database) that contains data pertaining to one or more OPC UA servers (such as the OPC UA server 310).

In certain embodiments, the network 305 represents a "cloud" of computers interconnected by one or more networks, where the network 305 is a computing system utilizing clustered computers and components to act as a single pool of seamless resources when accessed. In certain embodiments, the network 305 represents a wireless network that can range is sized from Near Field Communication (NFC) to Local Area Networks (LANs) to wide area networks (WAN). In certain embodiments, the network 305 provides access to the internet or other remote networks.

In certain embodiments, the OPC UA server 310 can be similar to the device 200 of FIG. 2. For example, the OPC UA server 310 can include internal and external components as previously depicted and described in further detail with respect to FIG. 2. The OPC UA server 310 can be similar to the server 116 of FIG. 1. The OPC UA server 310 includes OPC UA data access 312, OPC UA history access 314, OPC UA alarm and conditions 316, and OPC UA base and vendor modeling 318.

The OPC UA server 310 can include any number of OPC UA servers. Similarly, the OPC UA server 310 can be associated with any number of sensors 102a and actuators 102b of the industrial process control and automation system 100 of FIG. 1. The OPC UA server 310 includes individual address spaces, such as a node, that is associated with each piece of equipment and or sensor of the industrial process control and automation system 100 of FIG. 1. Each server of the OPC UA server 310 can include a plurality of layers, where each layer is based on the inputs previously entered. A description of the various layers of the OPC UA server 310 is discussed in further detail below with respect to FIG. 5.

For example, OPC UA is a protocol communication services that implements OPC UA M2M communication between sensors, actuators, and equipment (collectively referred to as IIoT devices) in an industrial plant. The OPC UA server 310 is one of a plurality of servers that communicate with and oversee the communication between the IIoT devices. Each of the IIoT devices communicating over an OPC UA communication protocol can be susceptible to an attack from a malicious actor. For example, in an industrial plant with thousands of sensors, a single weakness in the OPC UA server 310 can be exploited for data theft, cause a DOS, or bring down the entire IIoT ecosystem. The software that provides for OPC UA M2M communication between the IIoT devices can include a coding defect, such as a bug, that can be exploited. Such defects can include any vulnerability that causes a weakness in the software system. Weaknesses that can be exploited include the ability to inject malicious code to crash the system, such as by overloading a buffer. Weaknesses can also include a data loss or loss of equipment. In order to discover one or more weaknesses in the OPC UA server 310 and the various IIoT devices that communicate with as well as through the OPC UA server 310, fuzz testing can be performed. The fuzz testing tests the integrity of the OPC UA server 310 that allows open communication between the IIoT devices.

The OPC UA server 310 includes the OPC UA platform that allows for IIoT devices to communicate and generate information concerning the operation of the industrial plant. The OPC UA platform can include a client-server mechanism. For example, the server can be similar to the OPC UA server 310 while the client can be a user interface, such as the operator console 110 of FIG. 1. The OPC UA platform can include a publish subscribe pattern (pub-sub) such as a pub-sub cloud and a pub-sub distributed data protocol (DDP). A pub-sub pattern is a messaging pattern where senders of a message (called publishers) categorize messages into classes without knowledge of the receiver (called subscribers). The subscribers receive the message from the publisher that they subscribe to. The OPC UA platform can also be performed over a time sensitive network (TSN). A time sensitive network is a deterministic network that reduces the requirement for field busses in an industrial plant.

In certain embodiments, the OPC UA server 310 includes a data access repository 312, a history access repository 314, alarm and conditions repository 316, and base and vendor modeling 318. The OPC UA data access 312 includes real time data from the sensors and equipment. For example, the data access 312 can include real time temperature readings from a temperature sensor. The OPC UA history access 314 is a repository can stores logs of time series data. For example, history access 314 is a log of time stamped temperature readings form a temperature sensor over a period of time. The OPC UA alarm and conditions 316 is a repository that maintains a log of alarms, and changes to the OPC UA system. For example, if an alarm occurs as pressure increases beyond a threshold, the parameters associated with the alarm, are recorded and maintained in the alarm and conditions 316. The OPC UA base and vendor modeling 318 includes logs and data of customizations that deviate from the base OPC UA systems. For example, vender specific devices and industrial plant requirements are maintained in a repository within the base and vendor modeling.

The computing device 320 can be similar to the device 200 of FIG. 2. For example, the computing device 320 can include internal and external components as previously depicted and described in further detail with respect to FIG. 2. In certain embodiments, the computing device 320 is similar to the operator console 110 of FIG. 1. In certain embodiments, the computing device 320 is similar to a lab architecture that allows for testing of the OPC UA server 310 in a simulated network environment. In certain embodiments, computing device 320 is an automated build system that builds the program for the user when source code is changed. In certain embodiments, computing device 320 is a bench test that allows individual products to be tested during development stages. In certain embodiments, computing device 320 and the OPC UA server 310 are the same. In certain embodiments commuting devices 320 represents one or more separate computing devices. Computing device 320 includes a fuzzer 322 and an information repository 324.

In certain embodiments, the fuzzer 322 can be located within the computing device 320, within the OPC UA server 310, or on a cloud that can be, the OPC UA server 310, and the computing device 320. If the fuzzer 322 is not located on the OPC UA server 310, the fuzzer 322 can be utilized for remote testing of the OPC UA server 310.

The fuzzer 322 automates the task of fuzz testing the OPC UA server 310 for unknown or unseen conditions that would cause a DOS and can be used as an exploit by an attacker who intends to bring down the IIoT ecosystem, the OPC UA server 310, or both. For example, the fuzzer 322 recognizes and can generate OPC UA communication protocols to test the OPC UA server 310. The fuzzer 322 can include attack vector datasets that automate the task of fuzz testing the OPC UA server 310. The attack vector data sets provide knowledge and various data concerning the OPC UA server 310. The attack vector data is discussed in greater detail with respect to FIGS. 4A and 4B.

The fuzzer 322 improves the resilience of the IIoT ecosystem and the OPC UA server 310 by testing the OPC UA server 310 against various attacks such as a DOS attack. Additionally, the fuzzer 322 reduces the manual efforts spent in doing complex fuzz testing by performing an automatic or partially automatic testing due to its knowledge to the OPC UA server 310. As a result, the fuzzer 322 can increase the confidence among customers in adoption of OPC UA products, such as the OPC UA server 310, by providing an OPC UA server that is highly resilient to fuzz attacks. The fuzzer 322 can be deployed to test the OPC UA server 310 during development as well as production.

Figure 4A:
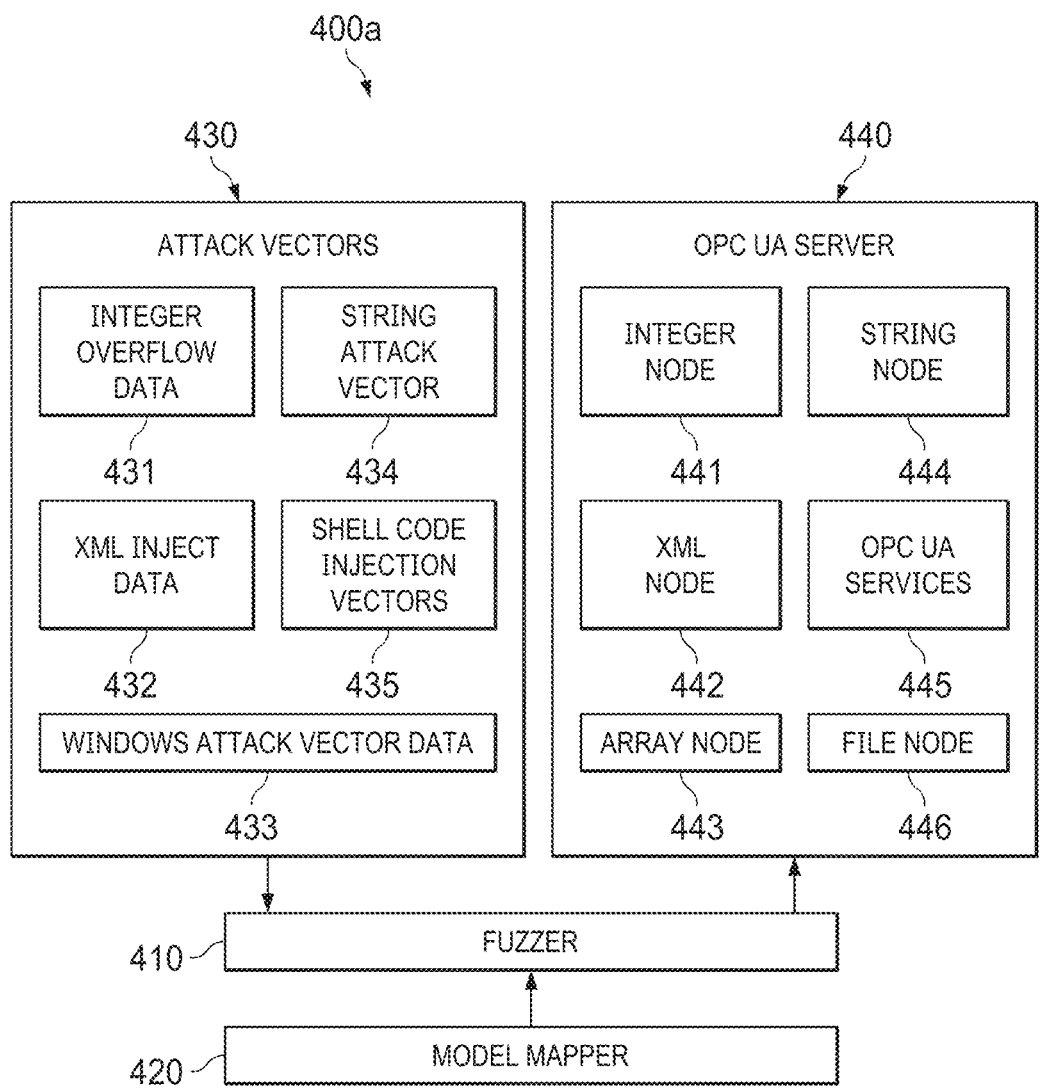
FIGS. 4A and 4B illustrate example block diagrams of a fuzzer in accordance with embodiments of the present disclosure.

In certain embodiments, the fuzzer 322 includes a model mapper, (discussed in greater detail with respect to the model mapper 420 of FIG. 4A). The model mapper maps the datasets, the attack vectors, the OPC UA server 310, various transport encodings or a combination thereof. The model mapper allows the fuzzer 322 to learn and identify aspects of the OPC UA server 310 for targeted testing. Based on the mapping, the fuzzer 322 loads the data sets to perform an attack on a target node of the OPC UA server 310. For example, for performing an XML injection exploit, the XML attack datasets can be loaded and an attack can be conducted on an XML node of the OPC UA server 310. In certain embodiments, the fuzzer 322 also enables testing of exposed transport encodings of the OPC UA server 310 and OPC UA service contracts. That is, the fuzzer 322 can perform end-to-end coverage by testing both transport encodings, service contracts, among others.

For example, the fuzzer 322 can test the main nodes of the OPC UA server 310. Based on the capabilities and datasets of the main nodes that are exposed, the fuzzer 322 can map the exposed datasets. Thereafter the fuzzer 322 can commence fuzz testing the individual nodes by attacking the various nodes to expose weaknesses in the OPC UA server 310.

In certain embodiments, the fuzzer 322 can classify and select attack vector datasets based on the semantics of the address-space nodes included in the OPC UA server 310. For example, the fuzzer 322 can parse through the attack vector datasets and select inputs for the OPC UA server 310 based on the information from the attack vector dataset. The fuzzer 322 can analyze the various address space nodes within the OPC UA server 310 and based on a semantic analysis identify particular nodes to test as well as particular inputs to use for particular address nodes. In certain embodiments, the fuzzer 322 can perform a fuzz test against an exposed IIoT node of the OPC UA server 310 through an application programming interface (API). For example, the fuzz test against an exposed IIoT node of the OPC UA server 310 is performed via a remote fuzzer node. In certain embodiments, the fuzzer 322 is able to disable fuzzing for at least one test case for the IIoT node under test. In certain embodiments, the fuzzer 322 is able to receive and process notifications for a fuzzed test case. In certain embodiments, the fuzzer 322 is able to execute security fuzzing test cases in a distributed way from a remote IIoT node. In certain embodiments, when processing a fuzzed test case the fuzzer 322 is able to monitor the system such as the entirety of the OPC UA server 310 being tested, the IIoT node under test, or both. When monitoring the system that is being tested, the fuzzer 322 is able to detect security flaws. The fuzzer 322 is also able to classify any detected security flaws. The fuzzer 322 is also able to prioritize any detected security flaws. For example, the fuzzer 322 is able to classify the priority of detected security flaws for the particular system being tested. The fuzzer 322 is also able to rank or weight security fuzz test cases in order to provide the most relevant input to test the node under inspection.

The fuzzer 322 is also able to establish a baseline performance profile for the system, such as the OPC UA server 310, being tested. For example, the fuzzer 322 can perform a cursory test of the OPC UA server 310 to establish a baseline profile that the fuzzer 322 refers back to when performing a thorough test of the OPC UA server 310. If the fuzzer 322 identifies a deviation from the bassline profile test and the full test, the fuzzer 322 can include the deviation in the report generated at the end of the fuzz testing.

The fuzzer 322 is able to expose various servers and types of the OPC UA server 310. For example, the fuzzer 322 can target and then attack various services of the OPC UA server 310. For instance, the fuzzer 322 can iterate through large datasets of attack vectors and inject specific inputs into the OPC UA server 310. The fuzz testing performed by the fuzzer 322 can be done for the OPC UA transport encodings, such as OPC UA Transmission Control Protocol (TCP) protocols and OPC UA User Datagram Protocol (DP). The fuzz testing performed by the fuzzer 322 can also test various OPC UA service contracts.

In certain embodiments, the fuzzer 322 can access a discovery server that identifies all the individual OPC UA servers, such as OPC UA server 310 on the network 305. That is, when network 305 includes multiple OPC UA servers, the discovery server allows the fuzzer 322 to find and identify one or more nodes of one or more servers to test. For example, the fuzzer 322 could use an OPC UA global discovery server to find OPC UA servers on a network in order to find a particular UA production server (such as OPC UA server 310) to test.

In certain embodiments, the fuzzer 322 uses a feedback loop to improve the generation of inputs to test the OPC UA server 310. Additionally, the fuzzer 322 can evolve the testing of a test server, such as OPC UA server 310, based on a newly received attack vectors dataset. For example, when an updated or a new attack vectors dataset is received the fuzzer 322 can identify and select new inputs for a more targeted test. The fuzzer 322 can also utilize artificial intelligence (AI) when testing the OPC UA server 310. For example, a Markov Decision Process can provide an intelligent feedback loop to improve the generation of inputs for the fuzzer 322. A further description of a Markov Decision Process is discussed below with respect to FIG. 7.

The fuzzer 322 can also generate a report that indicates the results of the fuzz testing of the OPC UA server 310. The fuzzer 322 can also generate a report that includes a vulnerability score based on the results from the fuzz testing of the OPC UA server 310. In certain embodiments, the report can be displayed on a graphical user interface (GUI). A report displayed on a GUI can allow a user to review the results or the test cases from the fuzz testing against a system test.

The fuzzer 322 can also be associated with the information repository 324. The information repository 324 can be implemented using any architecture known in the art, such as a relational database, an object-oriented database, one or more tables, or a combination thereof. In certain embodiments, the information repository 324 is located on the computing device 320. In certain embodiments, the information repository 324 is located remotely and can communicate with the fuzzer 322 through a network such as the network 305. The information repository 324 stores data associated with the fuzz testing of the OPC UA server 310. For example, the information repository 324 stores the input data and the particular node being tested, as well as any other metrics that are associated with each particular test. The information stored within the information repository 324 is used to generate a report that indicates the outcome of the fuzz testing by the fuzzer 322. The information repository 324 can encrypt the information, such as the metrics and results of the fuzz testing. In certain embodiments, the information repository 324 stores the attack vector datasets that the fuzzer 322 utilizes when testing the OPC UA server 310. The information repository 324 can also capture various system statistics from the OPC UA server 310 under a fuzz testing condition as well as at the end of the fuzz testing. The system statistics can be compared to one another and provide additional information associated with the fuzz testing. For example, if there is a discrepancy between the system statistics of the OPC UA server 310 during fuzz testing and the end of the fuzz testing can indicate whether one or more security vulnerabilities is exists.

Figure 3B:
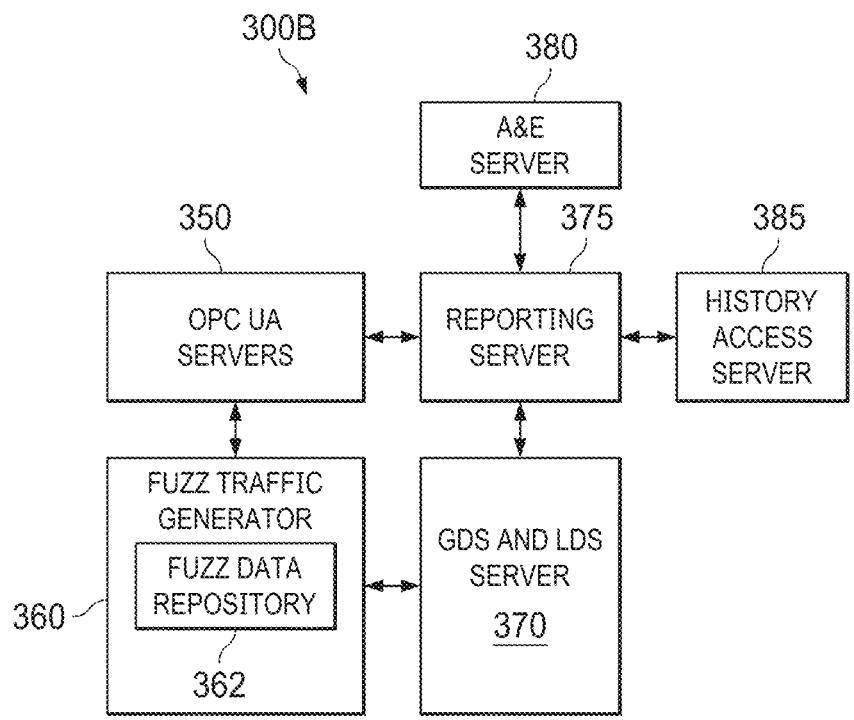
FIG. 3B illustrates an example block diagram of an OPC UA communication system for fuzz testing in accordance with embodiments of the present disclosure.

FIG. 3B illustrates an example block diagram of an OPC UA communication system for fuzz testing in accordance with embodiments of the present disclosure. FIG. 3B illustrates a high-level architecture, in accordance with an embodiment of this disclosure. The embodiment of the block diagram 300B shown in FIG. 3B is for illustration only. Other embodiments can be used without departing from the scope of the present disclosure. FIG. 3B provides additional details of how security analysis may be tailored to intelligently analyze IIoT devices of an industrial process control and automation system. For instance, a security analysis to intelligently analyze IIOT devices of an industrial process control and automation system can be tailored to the OPC UA infrastructure and protocols. Block diagram 300B includes an OPC UA servers 350 fuzz traffic generator 360, GDS and LDS servers 370, a reporting server 375, an A&E server 380, and a history access server 385.

In certain embodiments, the communication between the various components of FIG. 3B occurs via Ethernet. In certain embodiments, the communication between the various components of FIG. 3B occurs via TSN.

The OPC UA servers 350, is similar to the OPC UA server 310 of FIG. 3A. The OPC UA servers 350 represent any number of OPC UA servers at an industrial plant. The OPC UA servers 350 are the servers that undergo fuzz testing for vulnerability detection.

The fuzz traffic generator 360, is similar to the fuzzer 322 of FIG. 3A. The fuzz traffic generator 360 includes a fuzz data repository 362. In certain embodiments, the fuzz data repository is a standalone repository that the fuzz traffic generator 360 accesses. The fuzz data repository 362 maintains a repository of various attack vectors to be selected during fuzz testing. The fuzz traffic generator 360 selects various fuzz attack vectors to attack one or more of the OPC UA servers 350.

The global discovery server (GDS) and the local discovery server (LDS) 370 can be individual servers or a single server. In certain embodiments, the GDS and LDS server 370 can be similar to a gateway server, or the gateway 120 of FIG. 1. The GDS and LDS server 370 identify the OPC UA nodes within the OPC UA servers 350. In certain embodiments, the GDS and LDS server 370 can communicate with the fuzz traffic generator 360 through a network proxy, and a firewall for protection. The GDS and LDS server 370 can also communicate with the fuzz traffic generator 360. For example, the GDS and LDS server 370 can transmit a list of the OPC UA servers 350 to the fuzz traffic generator 360.

The reporting server 375 receives the reports of the fuzz testing from the OPC UA servers 350. The reporting server 375 can generate various fuzz reports and statistics, based on data received from the OPC UA servers 350. The reporting server 375 can generate a matrix to score each fuzz test of the OPC UA servers 350. In certain embodiments, the reporting server 375 can produce a score that indicates the security level of each of the OPC UA servers 350. When generating the report from the fuzz testing the reporting server 375 can access the alarms and the errors server 380, the history access server 385, of both. The alarms and the errors server 380 is similar to the alarms and conditions 316 of FIG. 3A. For example, the alarms and the errors server 380 is a repository that maintains a log of alarms, and changes to the OPC UA system. Similarly, the history access server 385 is similar to the history access 314 of FIG. 3A. For example, the history access server 385 can be a repository can stores logs of time series data. In certain embodiments, the reporting server 375 can communicate with a system watch dog.

Figure 4B:
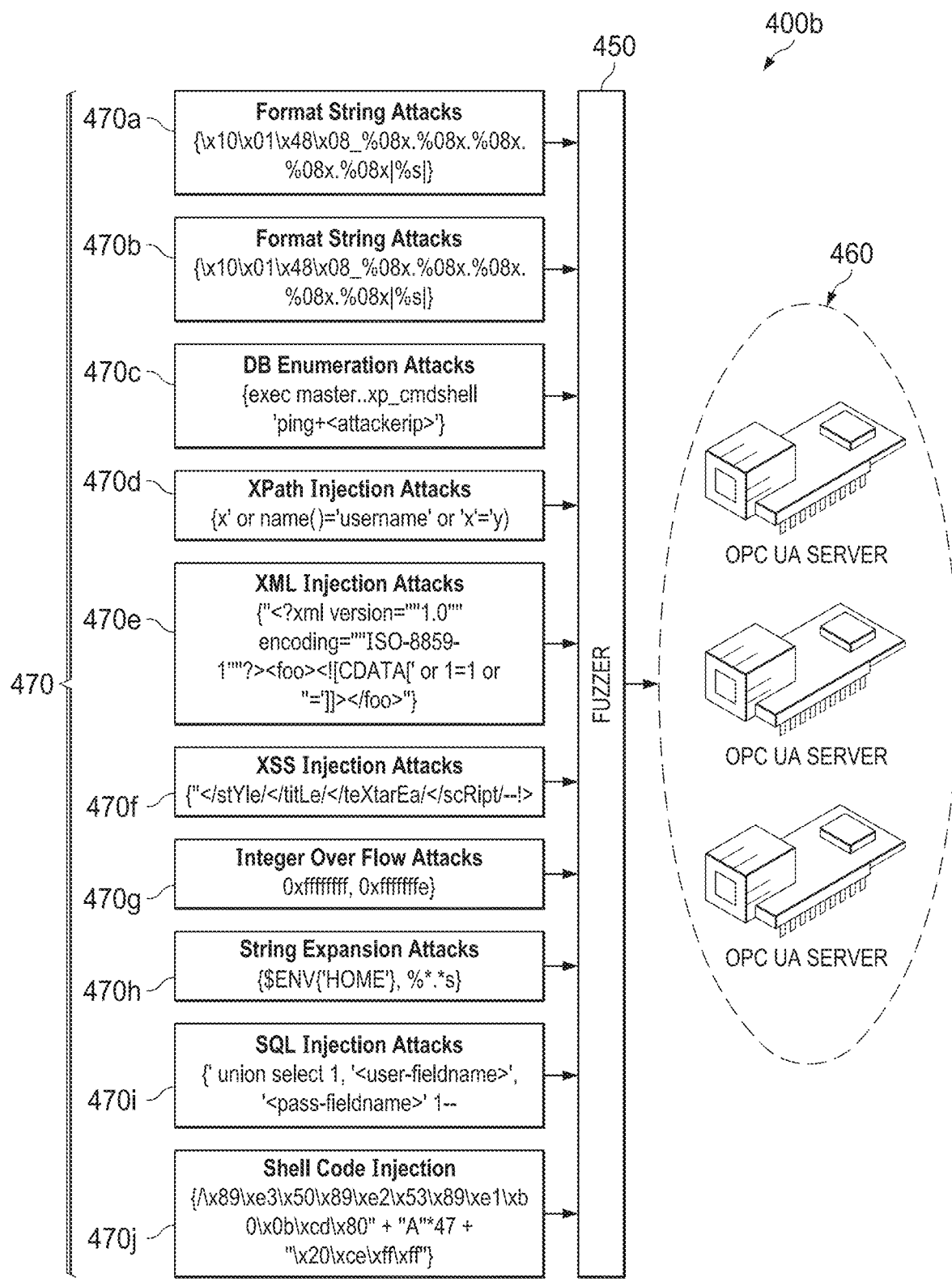

FIGS. 4A and 4B illustrate example block diagrams of a fuzzer in accordance with embodiments of the present disclosure. FIGS. 4A and 4B illustrate a high-level architecture, in accordance with an embodiment of this disclosure. The embodiment of the block diagrams 400a and 400b shown in FIGS. 4A and 4B, respectively, are for illustration only. In particular, block diagram 400a of FIG. 4A illustrates a detailed view of the block diagram 300A of FIG. 3A and block diagram 300B of FIG. 3B. Block diagram 400b of FIG. 4B illustrates a client server communication within an OPC UA environment as well as various fuzz attacks as executed by a fuzzer (such as the fuzzer 322 of FIG. 3A). Other embodiments can be used without departing from the scope of the present disclosure.

Block diagram 400a includes a fuzzer 410, a model mapper 420, attack vectors 430, and an OPC UA server 440. The fuzzer 410 can be similar to the fuzzer 322 of FIG. 3A and the fuzz traffic generator 360 of FIG. 3B. The OPC UA server 440 can be similar to the OPC UA server 310 of FIG. 3A and the OPC UA servers 350 of FIG. 3B. In particular the OPC UA server 440 illustrates a variety of nodes that can be exploited by a malicious attacker. The nodes include an integer node 441, an XML node 442, an array node 443, a string node 444, a OPC UA services 445, and a file node 446.

The model mapper 420 can be a standalone component or included as part the fuzzer 410. If the model mapper 420 is a stand along component, the model mapper 420 can be included in the computing device 320 of FIG. 3A or a standalone device. The model mapper 420 can include knowledge of the information model for UA systems. The information model can include knowledge of UA node structures, knowledge of UA tags, or the like. In other words, the OPC UA mapping provides the fuzzer 410 with knowledge of what is supposed to be present in a UA node. The fuzzer 410 then uses this information to generate attacks targeted to the particular OPC UA node of the OPC UA server 440 using the provided attack vector datasets. In certain embodiments, the model mapper 420 is similar to the GDS and LDS server 370.

In certain embodiments, the model mapper 420 is able to generate a mapped dataset of the OPC UA server 440. The mapped data dataset can be a portion of the OPC UA server 440.

In certain embodiments, the model mapper 420 can continuously analyze the entire OPC UA server 440, a portion of the OPC UA server 440, or a single node of the OPC UA server 440. In certain embodiments, the model mapper 420 can analyze on demand the entire OPC UA server 440, a portion of the OPC UA server 440, or a single node of the OPC UA server 440 on. For example, the model mapper 420 can analyze the OPC UA server 440 each time a fuzz test is conducted. In another example, the model mapper 420 can analyze the OPC UA server 420 a single instance, and store the mapped dataset in an information repository, similar to the information repository 324 of FIG. 3A.

The model mapper 420 identifies the structure of the node, as well as the various IIoT connected devices. The IIoT connected devices can each include a tag that identifies the equipment, sensor and the like, as well as provide context to classify the data generated from the IIoT device. The model mapper 420 is able to identify the various interfaces exposed between the IIoT devices for the fuzzer 410 to test. In certain embodiments, the model mapper 420 can identify the various interfaces due to its knowledge of the OPC UA communication protocols.

In certain embodiments the model mapper 420 can include knowledge of UA node structure, knowledge of UA tags, or the like. For example, the model mapper 420 provides the fuzzer 410 with knowledge of what is supposed to be present in an OPC UA server 440 including the various nodes and address spaces. The fuzzer 410 can utilize the information provided by the model mapper 420 to generate attacks targeted at a particular node of an OPC UA server, such as the OPC UA server 440 using the attack vector datasets.

The fuzzer 410 can also receive various attack vectors 430. The various attack vectors 430 can be uploaded to and stored in an information repository that is accessible to the fuzzer 410. In certain embodiments the various attack vectors 430 can be stored in the fuzz data repository 362 of FIG. 3B. The various attack vectors 430 can be included in the fuzzer 410. In certain embodiments, the attack vectors 430 are generated by the fuzzer based on the results of the model mapper 420. For example, the fuzzer tailors and adapts the individual attack vectors based on the mapping of the OPC UA server 440.

The attack vector 430 includes a variety of data that identifies pathways that a malicious actor could utilize to gain access to the OPC UA server 440. Stated differently, attack vectors 430 are pathways that enable hackers or malicious actors to exploit system vulnerabilities. The attack vectors 430 provide information to the fuzzer 410 that allow the fuzzer 410 to attempt to crash or detect errors within the OPC UA server 440. The fuzzer 410 attempts to detect errors and failures within the OPC UA server 440 in a controlled environment. By detecting any errors, failures, defects, and vulnerabilities of the OPC UA server 440 in a controlled environment, allows a programmer to develop source code or debug the existing program in order to prevent the error from occurring in the future. Preventing the error from occurring in the future eliminates that input as an access point for a malicious actor to negatively affect the industrial plant through the OPC UA server 440. The attack vectors 430 can include one or more datasets such as an integer overflow data 431, an XML inject data 432, a windows attack vector data 433, a string attack vector 434, and a shell code injection vector 435.

The integer overflow data 431 includes details of an attack that forces an integer variable to go out of a particular range. Using the information within integer overflow data 431, the fuzzer 410 can create attacks on the OPC UA server 440 to attempt to control a value of a particular variable and try to get it out of range. For instance, the integer in question is incremented past the maximum possible value, it may wrap to become a very small or negative number, therefore providing a very incorrect value which can lead to unexpected behavior. A result of the unexpected behavior can create an error within the OPC UA server 440 or cause a partial or complete DOS. For example, using the mapped dataset as generated by the model mapper 420, and the integer overflow data 431, the fuzzer 410 can identify the integer node 441 on the OPC UA server 440. The fuzzer 410 can also identify an integer variable it can manipulate as well as identify valid and invalid entries for the fuzzer to generate and load into the OPC UA server 440.

The XML inject data 432 provides data for an attack against an application that parses XML input. For example, when processing an XML input that contains a reference to an external entity, the reference can cause an error or lead to a leak of information from the OPC UA server 440. Using the mapped dataset as generated by the model mapper 420 and the XML inject data 432, the fuzzer 410 can select particular XML inputs to attack the XML node 442 to identify a vulnerability such as an error or a leak of information.

The windows attack vector data 433 can include various attack vectors that are common in the WINDOWS operating system. For example, the OPC UA server 440 can run on a WINDOWS system that supports the OPC UA M2M communication protocols. Using the mapped dataset as generated by the model mapper 420 and the windows attack vector data 433, the fuzzer 410 can select particular inputs to attack the WINDOWS operating system.

In certain embodiments, the string attack vector 434 is a targeted attack vector for the string node 444 of the OPC UA server 440. The shell code injection vectors 435 include a dataset of attack vectors that attempts to overload a buffer of the OPC UA server 440.

The OPC UA services 445 include the various services that are supported by the OPC UA server 440. The fuzzer 410 can utilize the information within the OPC UA services 445 to understand the services included in the OPC UA server 440 and attempt to gain access to any of the services. Additionally, the fuzzer 410 can attempt to access hidden services that are not exposed by the OPC UA server 440 but are still accessible. The fuzzer can identify hidden services even if they are not listed in the OPC UA services 445 based on the model mapper 420 and its knowledge of the OPC UA platform.

In certain embodiments, the file node 446 includes a mapping of the address space of a UA system. The fuzzer 410 uses knowledge of the OPC UA file node 446 to modify the node set file or to read the node set file to learn about the OPC UA nodes in a particular system, such as the OPC UA server 440. For example, the fuzzer 410 can identify variable types (such as, integer, floating point, string, etc.) of data in a node that allow the tool to attempt to exploit a vulnerability of a given variable of a given node in the targeted system. Based on whether the fuzzer 410 is successful or not on a given attack, the fuzzer is able to determine whether there are vulnerabilities in the OPC UA server 440.

In certain embodiments, the fuzzer 410 can compare what it finds in the file node 446 with the generated dataset from the model mapper 420 as well as other data derived from the various nodes of the OPC UA server 440. By comparing the data from the file node 446, the model mapper 420, and the various other nodes of the OPC UA server 440, the fuzzer 410 can identify deviations from the expected content and utilize the deviations as potential faults or vulnerabilities in the OPC UA server 440.

FIG. 4B illustrates a fuzzer 450, various OPC UA servers 460, and a various attack vectors 470*a*-470*j* (collectively referred to as attack vectors 470). For example, the fuzzer 450 can be similar to the fuzzer 410 of FIG. 4A, the fuzzer 322 of FIG. 3A, the fuzz traffic generator 360 of FIG. 3B, or a combination both. Each of the various OPC UA servers 460 can be similar to the OPC UA server 440 of FIG. 4A, the OPC UA server 310 of FIG. 3A, the OPC UA servers 350 of FIG. 3B, or a combination thereof. Each of the OPC UA servers 460 can be associated with an IIoT device or a plurality of IIoT devices and allow for communication using the OPC UA communication protocols. The various attack vectors 470 illustrate example data that the fuzzer 450 can utilize when attacking the various OPC UA servers 460. For example, attack vectors 470*a* and 470*b* are examples of string attacks and similar to the string attack vector 434 of FIG. 4A. The attack vector 470*e* is an example of an XML injection attack and similar the XML injection data 432 of FIG. 4A. The attack vector 470*g* is an example of an integer overflow attack and similar to the integer overflow data 431 of FIG. 4A. The attack vector 470*h* is an example of a string attack and similar to the string attack vector 434 of FIG. 4A. The attack vector 470*j* is an example of a shell code injection and similar to the shell code injection vectors 435 of FIG. 4A. The attack vectors 470*c*, 470*d*, 470*f*, and 470*i* are examples of additional attack vectors such as a database enumeration attack, an Xpath injection attack, XSS injection attack, an XXE attach, and an SQL injection attack, respectively. The example attack vectors 470 illustrate various attacks vectors the fuzzer 450 can utilize when attacking one or more OPC UA servers 460.

Figure 5:
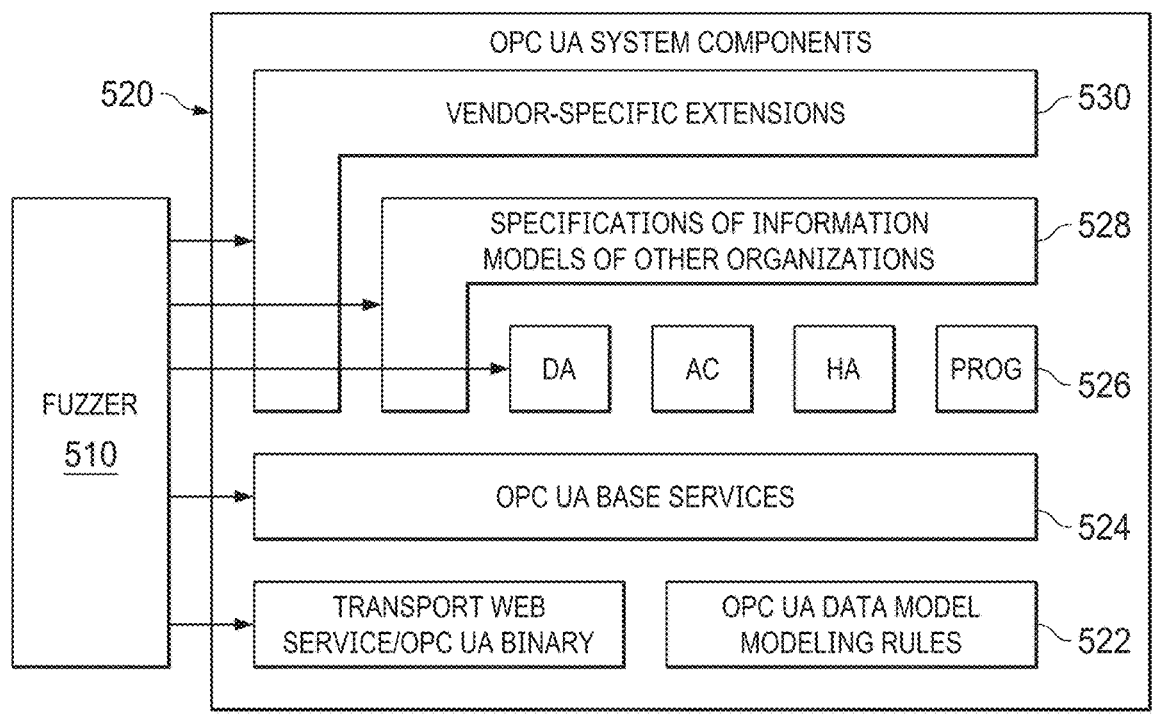
FIG. 5 illustrates example layers of a system in accordance with embodiments of the present disclosure.

FIG. 5 illustrates example layers of a system in accordance with embodiments of the present disclosure. The embodiments of FIG. 5 are for illustration only. Other embodiments can be used without departing from the scope of the present disclosure.

FIG. 5 illustrates a fuzzer 510 and OPC UA system components 520. The fuzzer 510 can be similar to the fuzzer 450 of FIG. 4B, the fuzzer 410 of FIG. 4A, the fuzzer 322 of FIG. 3A, or a combination thereof. The OPC UA system components illustrate various layers and services available within a single OPC UA server and can be similar to the OPC UA servers 460 of FIG. 4B, the OPC UA server 440 of FIG. 4A, the OPC UA server 310 of FIG. 3A, or a combination thereof.

The OPC UA system components 520 include a first layer 522, a second layer 524, a third layer 526, a fourth layer 528, and a fifth layer 530. The first layer 522 can be referred to as the OPC UA base, as it includes various transport encodings that support web services and OPC UA binary encodings that are platform independent. The first layer also includes an OPC UA data model that includes the modeling rules that provide information to the various upper level layers 524-530. The second layer 524 includes various OPC UA base services. The third layer 526 includes the OPC UA information model. The fourth layer 528 includes specifications of the various information models of the third layer 526. For example, the fourth layer 528 includes International Electrotechnical Commission (IEC), industry standard architecture rules and regulations (ISA), electronic Device Description Language (EDDL) and the like. The fifth layer 530 includes various vender specific extensions of the third layer 526 and the fourth layer 528. In certain embodiments various aspects of the fifth layer 530 is maintained in the base and vendor modeling 318.

Figure 6:
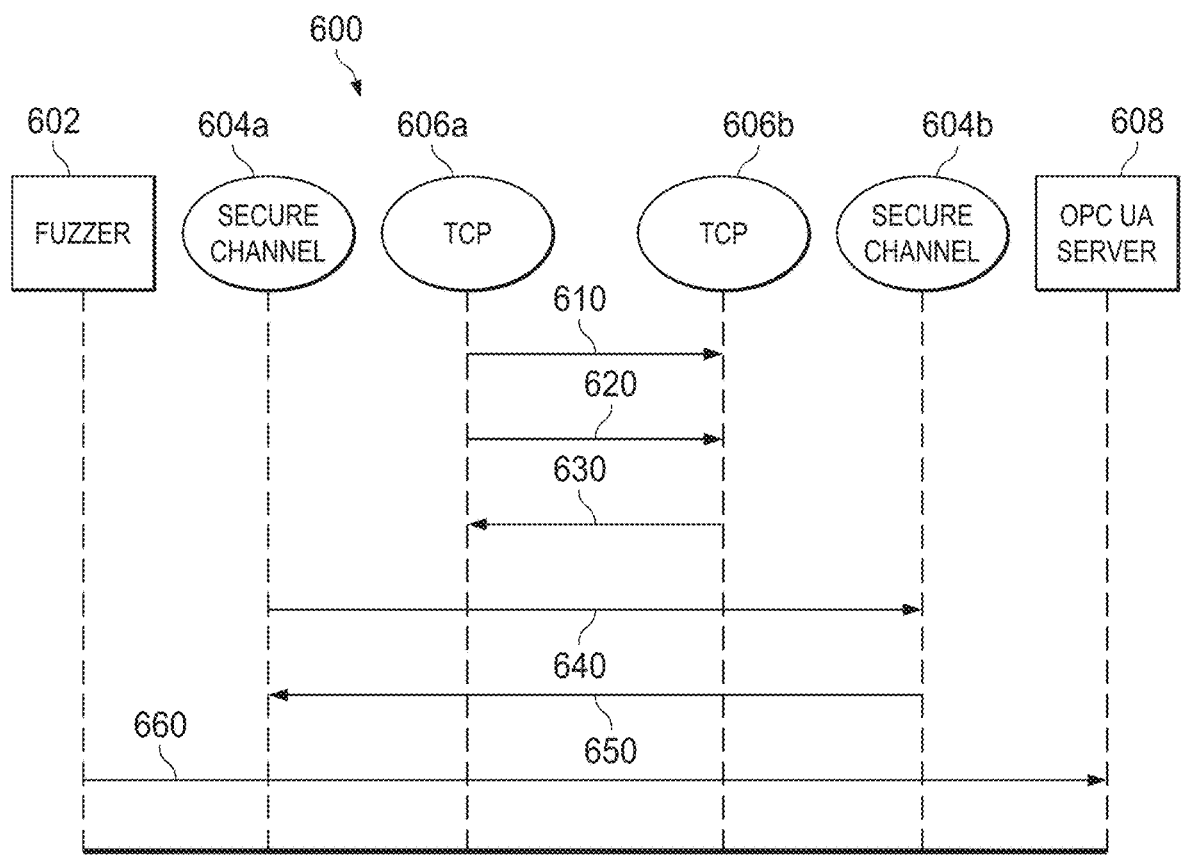
FIG. 6 illustrates an example command diagram in accordance with embodiments of the present disclosure.

FIG. 6 illustrates an example of a command diagram 600 in accordance with embodiments of the present disclosure. The command diagram 600 illustrates a fuzzer 602 establishing a communication with an OPC UA server 608. The embodiment of the command diagram 600 is for illustration only. Other embodiments can be used without departing from the scope of the present disclosure. For example, portions can be rearranged, added, or removed in different embodiments. Additionally, processes within the command diagram 600 may occur at separate times, in parallel, simultaneously.

In certain embodiments, the fuzzer 602 is similar to the fuzzer 510 of FIG. 5, the fuzzer 450 of FIG. 4B, the fuzzer 410 of FIG. 4A, the fuzz traffic generator 360 of FIG. 3B, the fuzzer 322 of FIG. 3A or a combination thereof. The OPC UA server 608 can be similar to the OPC UA servers 460 of FIG. 4B, the OPC UA server 440 of FIG. 4A, the OPC UA servers 350 of FIG. 3B, the OPC UA server 310 of FIG. 3A, or a combination thereof.

The command diagram 600 begins at 610 with a TCP 606*a* of the fuzzer 602 opening a socket to a TCP 606*b* of the OPC UA server 608. At 620, the TCP 606*a* of the fuzzer 602 transmits a message to the TCP 606*b* of the OPC UA server 608. The message can be a single that commences a communication between the fuzzer 602 and the OPC UA server 608. At 630, the TCP 606*b* of the OPC UA server 608 acknowledges the message from the TCP 606*a* of the fuzzer 602. At 640, a secure channel 604*a* of the fuzzer 602 transmits a request to open a secure channel to a secure channel 604*b* of the OPC UA server 608. At 650, the secure channel 604*b* of the OPC UA server 608 responds to the secure channel 604*a* of the fuzzer 602. If the response is permission to create a secure channel, at 660 the fuzzer 602 creates a secure session directly with the OPC UA server 608. Thereafter, the fuzzer 602 can communicate with and test the OPC UA server 608 for any vulnerability.

Figure 7:
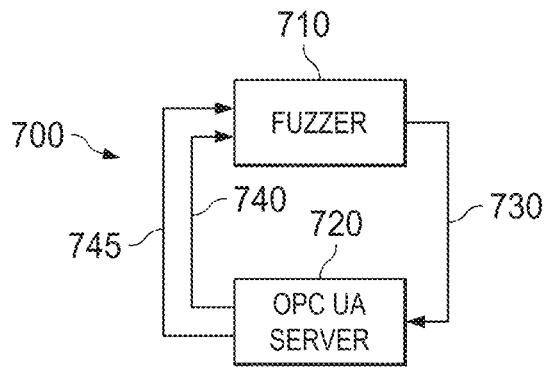
FIG. 7 illustrates an example block diagram of an intelligent fuzzing loop in accordance with embodiments of the present disclosure.

FIG. 7 illustrates an example block diagram 700 of an intelligent fuzzing loop in accordance with embodiments of the present disclosure. FIG. 7 illustrates a high-level architecture, in accordance with an embodiment of this disclosure. The embodiment of the block diagram 700 shown in FIG. 7 is for illustration only. Other embodiments can be used without departing from the scope of the present disclosure. Processes and communications depicted within the block diagram 700 can occur at separate times, in parallel, simultaneously, or any combination thereof. The block diagram 700 includes a fuzzer 710 communicating with and testing an OPC UA server 720 for vulnerabilities.

In certain embodiments, the fuzzer 710 is similar to the fuzzer 602 of FIG. 6, the fuzzer 510 of FIG. 5, the fuzzer 450 of FIG. 4B, the fuzzer 410 of FIG. 4A, the fuzz traffic generator 360 of FIG. 3B, the fuzzer 322 of FIG. 3A or a combination thereof. The OPC UA server 720 can be similar to the OPC UA server 608, the OPC UA servers 460 of FIG.

4B, the OPC UA server 440 of FIG. 4A, the OPC UA servers 350 of FIG. 3B, the OPC UA server 310 of FIG. 3A, or a combination thereof. In certain embodiments, the OPC UA servers 720 can be any number of OPC UA servers.

The block diagram 700 illustrates an OPC UA security fuzzing test performed by the fuzzer 710 as an AI loop. In certain embodiments, the AI loop of the block diagram 700 can be similar to a Markov Decision Process. For example, the fuzzer 710 performs an action 730, such as a fuzz test, on the OPC UA server 720. For instance, the particular action can be selected from an attack vector, similar to the attack vectors 430 of FIG. 4A. In response to the action 730, OPC UA server 720 provides feedback to the fuzzer 710 in the form of a reward 740 and a state 745.

It is noted that the block diagram 700 illustrates a single iteration of the AI loop. For example, the action 730 performed by the fuzzer 710 is one of a number of actions performed. The each subsequent action 730 performed by the fuzzer 710 to the OPC UA server 720 is modified based on the feedback (such as the reward 740, the state 745, or both) received from the OPC UA server 720. The AI loop can go through any number of iterations. For example, the fuzzer 710 can perform a predetermined number of actions 730. In another example the fuzzer 710 can continually perform an action 730 until at least one of a specific reward 740, or a specific state 745, is received from the OPC UA server 720. In another example the fuzzer 710 can continually perform an action 730 for a set period of time. In another example the fuzzer 710 can continually perform an action 730 until a predetermined event occurs. Action 730 changes for each iteration, as the action is tailored based in part on the specific reward 740, a specific state 745, or both, that are received from the OPC UA server 720.

The action 730 describes the action that the fuzzer 710 performs. For example, the various actions 730 that the fuzzer 710 can perform includes selecting a particular fuzz input from the attack vectors 430 of FIG. 4A and loading the selected attack vector into the OPC UA server 720 as an attempt to find a vulnerability. That is, the action 730 is a selected attack the fuzzer 710 performs on the OPC UA server 720.

The OPC UA server 720 returns both a reward 740 and a state 745 to the fuzzer 710. The state 745 indicates the state of the OPC UA server 720 following the action 730 (such as the attack) performed by the fuzzer 710. In certain embodiments, the state 745 is either (i) running, (ii) failed, (iii) communication, (iv) unknown, or (v) suspended. A state 745 that indicates that the OPC UA server 720 is running, can provide an indication to the fuzzer 710 that the attempted attack via action 730 failed. A state 745 that indicates that the OPC UA server 720 failed, can provide an indication to the fuzzer 710 that the attempted attack via action 730 succeed. In certain embodiments, after the fuzzer 710 receives the state 745 indicating that the OPC UA server 720 failed, the fuzzer 710 can conclude its testing and generate a report indicating the inputs that lead to the failure of the OPC UA server 720. In certain embodiments, after the fuzzer 710 receives the state 745 indicating that the OPC UA server 720 failed the fuzzer 710 can continue testing another OPC UA server or another portion of the OPC UA server 720 that did not fail. A state 745 that indicates that the OPC UA server 720 is communication can provide an indication to the fuzzer 710 that the attempted attack via action 730 might have failed. For example, the OPC UA server 720 might have suffered a data breach or a portion of the server failed while another portion is still in communication with the fuzzer 710. A state 745 that indicates that the OPC UA server 720 is unknown can provide an indication to the fuzzer 710 that the attempted attack via action 730 might have succeeded. For example, if the state of the OPC UA server 720 is unknown, the fuzzer 710 can continue to attack the OPC UA server 720 until the state 745 is identifiable is being either running or failed. A state 745 that indicates that the OPC UA server 720 is suspended can provide an indication to the fuzzer 710 that the attempted attack via action 730 succeed. For example, the fuzzed attack via action 730 could deactivate and remove the OPC UA server 720 from communicating with the various IIoT devices thereby causing it to go into a suspended state. In another example, a state 745 that indicates that the OPC UA server 720 is suspended can provide an indication to the fuzzer 710 that the attempted attack via action 730 failed, as the OPC UA server 720 could be suspended as a precaution if the OPC UA server 720 detects it is under attack by the fuzzer 710.

In certain embodiments, the reward 740 can include a "+ve" or a "−ve" depending on the state 745 of the OPC UA server 720. For example, the reward 740 is provided from the OPC UA server 720 to the fuzzer 710 and is based on the action the fuzzer 710 took and the end result of the attack on the OPC UA server 720. That is, a particular reward 740 is transmitted to the fuzzer 710 based on the success of the fuzzer 710 attack on a targeted node of the OPC UA server 720. For example, if the state 745 indicates that the OPC UA server 720 has (i) failed, (ii) communication, (iii) unknown, or (iv) suspended, the reward 740 could be "+ve." In another example, if the state 745 indicates that the OPC UA server 720 is still of running, then the reward 740 of "−ve."

The fuzzer 710 receives both the state 745 and the reward 740 (of either "+ve" or a "−ve") from the OPC UA server 720 in response to a particular action 730. The set of actions 730 the fuzzer 710 took can define a policy and the set of rewards the fuzzer received can define values. Based on the policy and the values, the fuzzer 710 attempts to maximize rewards by choosing a correct policy. That is, the fuzzer 710 attempts select particular inputs that generate a reward of to receive a reward 740 of "+ve," which indicates that the OPC UA server 720 has (i) failed, (ii) communication, (iii) unknown, or (iv) suspended. By incenting the fuzzer 710 to receive particular rewards improves the fuzz testing performed by the fuzzer 710. The actions 730 of the fuzzer 710 are then partially random and partially controlled in order to improve the fuzz testing by finding vulnerabilities of the OPC UA server 720. Stated differently the actions 730 of the fuzzer 710 are optimized to find vulnerabilities of the OPC UA server 720 by attacking the server based on the various attack vectors 430 of FIG. 4A and the knowledge of the OPC UA platform.

Figure 8:
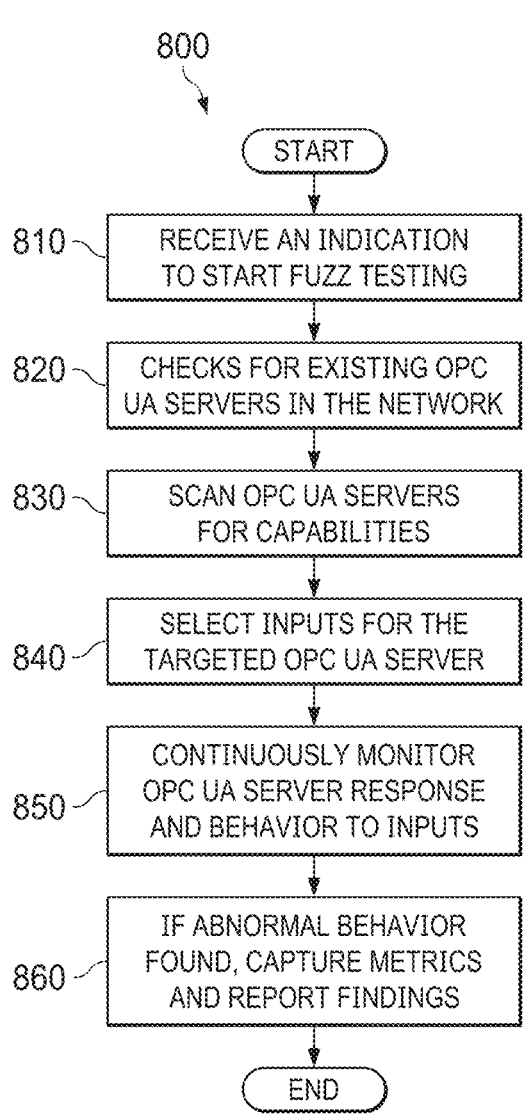
FIG. 8 illustrates a method for software vulnerability detection in accordance with embodiments of the present disclosure.

FIG. 8 illustrates a method 800 for software vulnerability detection in accordance with embodiments of the present disclosure. The method 800 does not limit the scope of this disclosure to any particular embodiments. While the method 800 provides a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. For ease of explanation, the steps of the method 800 are described with respect to a fuzzer testing an OPC UA server. In certain embodiments, the fuzzer is similar to the fuzzer 710 of FIG. 7, the fuzzer 602 of FIG. 6, the fuzzer 510 of FIG. 5, the fuzzer 450 of FIG. 4B, the fuzzer 410 of FIG. 4A, the fuzz traffic generator 360 of FIG. 3B, the fuzzer 322 of FIG. 3A or a combination thereof.

As shown in the method 800, at step 810 the fuzzer receives an indication to start fuzz testing. The indication to start fuzz testing can be of a particular OPC UA server located on a IIoT network. The indication to start fuzz testing can be multiple OPC UA servers located on a IIoT network. The indication to start fuzzing can be invoked, periodically, or on demand.

In certain embodiments, the indication to start fuzzing occurs in a lab environment including a simulated network environment to test new components of an OPC UA server. The indication to start fuzzing can occur automatically in an automated build system. In certain embodiments, the indication to start fuzzing occurs on a bench test thereby allowing individual products to be tested during development stages.

At step 820 the fuzzer checks for existing OPC UA severs on the network. For example, in response to receiving an indication to start fuzz testing, the fuzzer searches for one or more OPC UA servers within the network.

When one or more OPC UA servers are found on the network, at step 830 the fuzzer scans through the capabilities of each server found. The capabilities include one or more nodes that are to be fuzz tested. For example, the nodes can include one or more nodes as depicted and described above with respect to the OPC UA server 440 of FIG. 4A. For instance the capabilities can include an integer node, an XML node, an array node, a string node, a file node, and various OPC UA services. The scanning of the capabilities of each sever can also include mapping each server to identify the structure of each node as well as classify the various nodes of the OPC UA sever.

Based on the capabilities of the OPC UA server, at steps 840 and 850 the fuzzer selects inputs for the targeted OPC UA server and its services and monitors the response and behavior of the server in response to each targeted attack. The inputs that are selected by the fuzzer are intended to find vulnerabilities of the OPC UA server. The fuzzer inputs various data based on attack vectors into the server and will monitor the responses and behavior of the OPC UA server in response to each malicious fuzzed attack.

If an abnormal behavior is found at step 860 the fuzzer records the various metrics that were selected and inputted into the OPC UA server. The fuzzer can also generate a report that indicates the inputs and the consequence of the particular inputs to the server. In certain embodiments, the fuzzer can transmit the generated report to an information repository for further analysis by the fuzzer or a user. Based on the report, additional source code can be added to the server to prevent a similar attack that caused the failure in the future.

Figure 9:
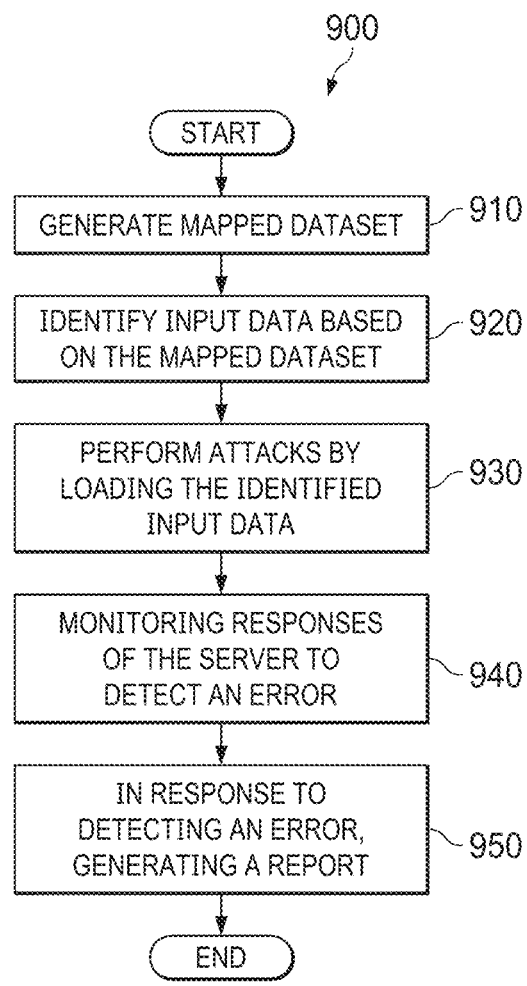
FIG. 9 illustrates another method for software vulnerability detection in accordance with embodiments of the present disclosure.

FIG. 9 illustrates a method 900 for software vulnerability detection in accordance with embodiments of the present disclosure. The method 900 does not limit the scope of this disclosure to any particular embodiments. While the method 900 provides a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. For ease of explanation, the steps of the method 900 are described with respect to a fuzzer testing an OPC UA server. In certain embodiments, the fuzzer is similar to the fuzzer 710 of FIG. 7, the fuzzer 602 of FIG. 6, the fuzzer 510 of FIG. 5, the fuzzer 450 of FIG. 4B, the fuzzer 410 of FIG. 4A, the fuzz traffic generator 360 of FIG. 3B, the fuzzer 322 of FIG. 3A or a combination thereof.

As shown in the method 900, the fuzzer generates a mapped dataset of a server, at step 910. The server can be one or more OPC UA servers that the fuzzer is instructed to test for vulnerabilities. The OPC UA server is compatible with OPC UA M2M communication protocols. The OPC UA server includes various services and transport encodings such as UATCP and UADP. For example, the OPC UA servers as a communication platform for the various IIoT devices at the industrial plant similar to the industrial process control and automation system 100 of FIG. 1. In certain embodiments, the fuzzer maps a portion of the OPC UA server or servers. In certain embodiments, the fuzzer maps the entirety of the OPC UA server or servers. Mapping the OPC UA server generates a dataset that the fuzzer utilizes in deriving knowledge about the OPC UA server and the various layers and components included in the OPC UA server. For example, the generated dataset can provide an indication to the fuzzer of particular input types that each node requires in order to access a higher layer of the OPC UA sever.

At step 920, the fuzzer identifies inputs based on the mapped dataset. Each of the input are selected from the various attack vectors. In certain embodiments, the fuzzer receives the attack vectors from an information repository. In certain embodiments, the attack vectors are stored within the fuzzer tool. In certain embodiments, the fuzzer generates the attack vectors based on the mapped OPC UA server, in order to tailor the specific attacks to the OPC UA sever specific server being tested. The fuzzer can also access particular attack vectors that are stored remotely based on the particular nodes of the OPC UA server. For example, based on the generated mapped dataset, the fuzzer is able to identify the various nodes of the OPC UA server. Based on the nodes, that are available for testing, the fuzzer is able to identify and select particular attack vectors to test the OPC UA server. In certain embodiments, the identified inputs include one of a string format attack vector, a shell code injection attack, a buffer flow attack, and an integer overflow attack, an XML injection data, and the like. For example, if the generated mapped dataset indicates an integer node then the fuzzer will select various integer overflow data as the inputs to test the OPC UA server. In another example, if the generated mapped dataset indicates an XML node then the fuzzer will select various XML data as the inputs to test the OPC UA server.

At step 930, the fuzzer performs various attacks by loading the identified input into the OPC UA server. The fuzzer also monitors each response of the OPC UA server in response to each attack in order to detect an error or failure at step 940. Steps 930 and 940 can occur multiple times as the fuzzer continually performs new attacks and monitors the responses of the OPC UA server in response to each targeted attack. In certain embodiments, the fuzzer iterates though large datasets of attack vectors to expose various vulnerabilities of the OPC UA server. For example, the fuzzer can analyze each attack that is performed based on a particular attack vector and the response from the server in order to derive knowledge of the server. In certain embodiments, the fuzzer is able to classify address spaces of the OPC UA server based on semantics in order to more accurately tailor each future attack against the server. For example, by identifying a particular node, the fuzzer is able to exploit any vulnerabilities associated therewith. The fuzzer includes data of the various protocols of the OPC UA server thereby allowing the fuzzer to modify the attack vectors specific to each specific OPC UA server being tested.

In certain embodiments, the fuzzer performs a plurality of targeted attacks against the OPC UA server. During each attack, the fuzzer loads a particular input into the OPC UA server. In response loading the input into the server, the fuzzer receives both a reward and a state of the OPC UA server from the OPC UA server. The state of the OPC UA server indicates whether the server is functioning within normal predefined limits. The reward can one of two values. For example, the values can be a first value of "−ve" and a second value of "+ve." The OPC UA server can return a "−ve" reward when the state indicates that the OPC UA server is functioning normally. The OPC UA server can return a "+ve" reward when the state indicates that the OPC UA server enters at least one of a failed state, a communication state, an unknown state, or a suspended state. The fuzzer continually tests the OPC UA server in order to receive more of the "+ve" rewards in order to detect and exploit hidden vulnerabilities of the OPC UA server.

At step 950, in response to detecting an error or failure, the fuzzer generates a report. In certain embodiments, the report is generated by the reporting server 375 of FIG. 3B. The report indicates detected errors and failures. In certain embodiments, the report can correlate results from the variety of different attacks performed by the fuzzer and identifies which attack (or set of attacks) caused the error with the OPC UA server. In certain embodiments, the fuzzer is able to identify various metrics that are associated with the error and include the metrics in the generated report. The metrics can include the particular node that the fuzzer was attacking. The metrics can include the various attack vector dataset the fuzzer utilized for the attack. The metrics can include the particular inputs the fuzzer utilized for the attack. The report is utilized to identify the particular vulnerability of the OPC UA server and allow a user to remove the particular vulnerability. In certain embodiments, a feedback loop is used to improve generation of inputs for the fuzzer.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method for vulnerability detection, the method comprising: generating a mapped dataset of a portion of an OPC Unified Architecture (UA) server by mapping the portion of the OPC UA server, the generated mapped dataset identifies OPC UA nodes, wherein the OPC UA server is compatible with machine to machine (M2M) OPC UA protocol communication including transport encodings and services; identifying input test data to test the portion of the OPC UA server based in part on the mapped dataset set in order to detect errors; performing a plurality of targeted attacks by loading the input test data onto the portion of the OPC UA server; obtaining at least one attack vector dataset associated with the OPC UA server; and mapping the input test data to fuzz test object oriented data of the OPC UA server, wherein the input test data is identified from the at least one attack vector data set; in response to loading the input test data into the OPC UA server, monitoring responses of the OPC UA server to detect an error; and in response to detecting the error, generating a report that indicates the error.

2. The method of claim 1, further comprising:
analyzing at least one attack vector dataset to derive knowledge of the OPC UA server based on exposed capabilities of the OPC UA server;
classifying address spaces of the OPC UA nodes based on semantics; and
in response to analyzing the at least one attack vector dataset, selecting one dataset from the at least one attack vector dataset, based on the classified address spaces of the OPC UA nodes, as the input test data to test the portion of the OPC UA server.

3. The method of claim 1, further comprises:
analyzing the portion of the OPC UA server while performing the plurality of targeted attacks;
loading the identified input test data into the portion of the OPC UA server; and
in response to loading the input test data into the portion of OPC UA server, receiving a reward and a state from the OPC UA server,
wherein the state indicates whether the OPC UA server is functioning normally,
wherein the reward is a first value when the state indicates that the OPC UA server is functioning normally, and the reward is a second value when the state indicates that the OPC UA server enters at least one of a failed state, a communication state, an unknown state, a suspended state, or an indication of one or more abnormal conditions, and
wherein to perform the plurality of targeted attacks comprises receiving more of the second values than the first values.

4. The method of claim 3, further comprises using a Markov decision process.

5. The method of claim 1, wherein the input test data to test the portion of the OPC UA server comprises at least one of a string format attack, an XML injection attack, a shell code injection attack, a buffer flow attack, an integer overflow attack, a XXE attack, and an SQL injection attack.

6. The method of claim 1, wherein to identify the input test data the method further comprises selecting input test data to test transport encodings of the OPC UA server including the OPC UA protocol, the transport encodings,
wherein the input test data is based in part on the mapped dataset set and data relating to the OPC UA protocol.

7. The method of claim 1, wherein in response to detecting the error, the method further comprises identifying metrics associated with the detected error, the metrics including the input test data; and
wherein the generated report further indicates the identified metrics that are associated with the detected error.

8. An electronic device for vulnerability detection, the electronic device comprising: a communication unit configured to communicate with an OPC Unified Architecture (UA) server; an interface; and a processor operably connected to the communication unit and the interface, wherein the processor is configured to: generate a mapped dataset of a portion of the OPC UA server by mapping the portion of the OPC UA server, the generated mapped dataset identifies OPC UA nodes, wherein the OPC UA server is compatible with machine to machine (M2M) OPC UA protocol communication including transport encodings and services; identify input test data to test the portion of the OPC UA server based in part on the mapped dataset set in order to detect errors; perform a plurality of targeted attacks by loading the input test data onto the portion of the OPC UA server; obtain at least one attack vector dataset associated with the OPC UA server; and map the input test data to fuzz test object oriented data of the OPC UA server, wherein the input test data is identified from the at least one attack vector data set; in response to loading the input test data into the OPC UA server, monitor responses of the OPC UA server to detect an error; and in response to detecting the error, generate a report that indicates the error.

9. The electronic device of claim 8, wherein the processor is further configured to:
analyze at least one attack vector dataset to derive knowledge of the OPC UA server based on exposed capabilities of the OPC UA server;
classify address spaces of the OPC UA nodes based on semantics; and
in response to analyzing the at least one attack vector dataset, select one dataset from the at least one attack vector dataset, based on the classified address spaces of the OPC UA nodes, as the input test data to test the portion of the OPC UA server.

10. The electronic device of claim 8 wherein the processor is further configured to:
analyze the portion of the OPC UA sever while performing the plurality of targeted attacks;
load the identified input test data into the portion of the portion of the OPC UA server; and
in response to loading the input test data into the portion of the OPC UA server, receive a reward and a state from the OPC UA server,
wherein the state indicates whether the OPC UA server is functioning normally,
wherein the reward is a first value when the state indicates that the OPC UA server is functioning normally, and the reward is a second value when the state indicates that the OPC UA server enters at least one of a failed state, a communication state, an unknown state, a suspended state, or an indication of one or more abnormal conditions, and
wherein to perform the plurality of targeted attacks the processor is further configured to receive more of the second values than the first values.

11. The electronic device of claim 10, wherein the processor is configured to use a Markov decision process.

12. The electronic device of claim 8, wherein the input test data to test the portion of the OPC UA server comprises at least one of a string format attack, an XML injection attack, a shell code injection attack, a buffer flow attack, an integer overflow attack, an XXE attack, and an SQL injection attack.

13. The electronic device of claim 8, wherein to identify the input test data the processor is further configured to select input test data to test transport encodings of the OPC UA server including the OPC UA protocol, the transport encodings,
wherein the input test data is based in part on the mapped dataset set and data relating to the OPC UA protocol.

14. The electronic device of claim 8, wherein in response to detecting the error, the processor is further configured to, identify metrics associated with the detected error, the metrics including the input test data; and
wherein the generated report further indicates the identified metrics that are associated with the detected error.

15. A non-transitory computer readable medium embodying a computer program, the computer program comprising computer readable program code that when executed by a processor of an electronic device causes the processor to: generate a mapped dataset of a portion of a OPC United Architecture (UA) server by mapping the portion of the OPC UA server, the generated mapped dataset identifies OPC UA nodes, wherein the OPC UA server is compatible with machine to machine (M2M) OPC UA protocol communication including transport encodings and services; identify input test data to test the portion of the OPC UA server based in part on the mapped dataset set in order to detect errors; perform a plurality of targeted attacks by loading the input test data onto the portion of the OPC UA server; obtain at least one attack vector dataset associated with the OPC UA server; and map the input test data to fuzz test object oriented data of the OPC UA server, wherein the input test data is identified from the at least one attack vector data set;

in response to loading the input test data into the OPC UA server, monitor responses of the OPC UA server to detect an error; and in response to detecting the error, generate a report that indicates the error.

16. The non-transitory computer readable medium of claim 15, wherein the computer readable medium further comprises program code that, when executed at the processor, causes the processor to:
  analyze at least one attack vector dataset to derive knowledge of the OPC UA server based on exposed capabilities of the OPC UA server;
  classify address spaces of the OPC UA nodes based on semantics; and
  in response to analyzing the at least one attack vector dataset, select one dataset from the at least one attack vector dataset, based on the classified address spaces of the OPC UA nodes, as the input test data to test the portion of the OPC UA server.

17. The non-transitory computer readable medium of claim 15, wherein the computer readable medium further comprises program code that, when executed at the processor, causes the processor to:
  analyze the portion of the OPC UA sever while performing the plurality of targeted attacks;
  load the identified input test data into the portion of the OPC UA server; and
  in response to loading the input test data into the portion of the OPC UA server, receive a reward and a state from the OPC UA server,
  wherein the state indicates whether the OPC UA server is functioning normally,
  wherein the reward is a first value when the state indicates that the OPC UA server is functioning normally, and the reward is a second value when the state indicates that the OPC UA server enters at least one of a failed state, a communication state, an unknown state, or a suspended state, or an indication of one or more abnormal conditions; and
  wherein to perform the plurality of targeted attacks the processor is further configured to receive more of the second values than the first values.

18. The non-transitory computer readable medium of claim 15, wherein to identify the input test data the computer readable medium further comprised program code that, when executed at the processor, causes the processor to select input test data to test transport encodings of the OPC UA server including the OPC UA protocol, the transport encodings,
  wherein the input test data is based in part on the mapped dataset set and data relating to the OPC UA protocol.

* * * * *